(12) United States Patent
Ni et al.

(10) Patent No.: US 12,039,150 B2
(45) Date of Patent: *Jul. 16, 2024

(54) PROVIDING COMPOSITE GRAPHICAL ASSISTANT INTERFACES FOR CONTROLLING VARIOUS CONNECTED DEVICES

(71) Applicant: GOOGLE LLC, Mountain View, CA (US)

(72) Inventors: Yuzhao Ni, Sunnyvale, CA (US); David Roy Schairer, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,842

(22) Filed: Feb. 13, 2023

(65) Prior Publication Data

US 2023/0185429 A1 Jun. 15, 2023

Related U.S. Application Data

(63) Continuation of application No. 16/532,962, filed on Aug. 6, 2019, now Pat. No. 11,579,749, which is a
(Continued)

(51) Int. Cl.
*G06F 3/0482* (2013.01)
*G06F 3/04812* (2022.01)
(Continued)

(52) U.S. Cl.
CPC ........ *G06F 3/0482* (2013.01); *G06F 3/04812* (2013.01); *G06F 3/0484* (2013.01);
(Continued)

(58) Field of Classification Search
CPC .. G06F 3/0482; G06F 3/04812; G06F 3/0484; G10L 15/22; G10L 2015/223; H04L 12/282; H04L 67/12
See application file for complete search history.

(56) References Cited

U.S. PATENT DOCUMENTS

| 5,727,174 A | 3/1998 | Aparicio, IV et al. |
| 8,498,572 B1 | 7/2013 | Schooley et al. |

(Continued)

FOREIGN PATENT DOCUMENTS

| CN | 106462617 | 2/2017 |
| CN | 107562023 | 1/2018 |

(Continued)

OTHER PUBLICATIONS

European Patent Office; Communication issue in Application No. 20200530.2; 8 pages; dated Dec. 1, 2022.
(Continued)

*Primary Examiner* — Yongjia Pan
(74) *Attorney, Agent, or Firm* — Gray Ice Higdon

(57) ABSTRACT

Methods, apparatus, systems, and computer-readable media are provided for tailoring composite graphical assistant interfaces for interacting with multiple different connected devices. The composite graphical assistant interfaces can be generated proactively and/or in response to a user providing a request for an automated assistant to cause a connected device to perform a particular function. In response to the automated assistant receiving the request, the automated assistant can identify other connected devices, and other functions capable of being performed by the other connected devices. The other functions can then be mapped to various graphical control elements in order to provide a composite graphical assistant interface from which the user can interact with different connected devices. Each graphical control element can be arranged to reflect how each connected (Continued)

device is operating simultaneous to the presentation of the composite graphical assistant interface.

20 Claims, 13 Drawing Sheets

Related U.S. Application Data continuation-in-part of application No. 16/480,523, filed as application No. PCT/US2019/016371 on Feb. 1, 2019, now Pat. No. 11,256,390.

(60) Provisional application No. 62/668,131, filed on May 7, 2018.

(51) Int. Cl.
  *G06F 3/0484*  (2022.01)
  *G10L 15/22*  (2006.01)
  *H04L 12/28*  (2006.01)
  *H04L 67/12*  (2022.01)

(52) U.S. Cl.
  CPC ............ *G10L 15/22* (2013.01); *H04L 12/282* (2013.01); *H04L 67/12* (2013.01); *G10L 2015/223* (2013.01)

(56) References Cited

U.S. PATENT DOCUMENTS

| | | | |
|---|---|---|---|
| 8,849,430 | B2 | 9/2014 | Elston |
| 9,230,560 | B2 | 1/2016 | Ehsani et al. |
| 9,299,029 | B1 | 3/2016 | Kim |
| 9,747,083 | B1 | 8/2017 | Roman et al. |
| 10,025,463 | B2* | 7/2018 | Shearer ............... G06F 3/04886 |
| 10,134,399 | B2 | 11/2018 | Lang |
| 10,181,960 | B2 | 1/2019 | Kim |
| 10,185,934 | B2 | 1/2019 | Gupta |
| 10,409,551 | B1 | 9/2019 | Waugh |
| 10,469,281 | B2* | 11/2019 | McLaughlin ........... H04L 67/12 |
| 11,256,390 | B2 | 2/2022 | Ni et al. |
| 11,693,533 | B2 | 7/2023 | Ni |
| 2005/0097478 | A1 | 5/2005 | Killian et al. |
| 2005/0172228 | A1 | 8/2005 | Kakuda |
| 2009/0183070 | A1 | 7/2009 | Robbins |
| 2010/0122215 | A1 | 5/2010 | MacGregor |
| 2010/0332235 | A1 | 12/2010 | David |
| 2013/0082827 | A1 | 4/2013 | Cho et al. |
| 2013/0139089 | A1 | 5/2013 | Cho et al. |
| 2013/0253937 | A1 | 9/2013 | Cho et al. |
| 2014/0098247 | A1 | 4/2014 | Rao et al. |
| 2014/0108019 | A1 | 4/2014 | Ehsani et al. |
| 2014/0167931 | A1 | 6/2014 | Lee et al. |
| 2014/0218372 | A1 | 8/2014 | Missig et al. |
| 2014/0218517 | A1 | 8/2014 | Kim et al. |
| 2014/0282967 | A1 | 9/2014 | Maguire et al. |
| 2014/0317502 | A1 | 10/2014 | Brown et al. |
| 2015/0019710 | A1 | 1/2015 | Shaashua et al. |
| 2015/0066158 | A1 | 3/2015 | Kim |
| 2015/0082225 | A1 | 3/2015 | Shearer |
| 2015/0160797 | A1 | 6/2015 | Shearer et al. |
| 2015/0195365 | A1 | 7/2015 | Choi et al. |
| 2015/0227118 | A1 | 8/2015 | Wong |
| 2015/0254057 | A1 | 9/2015 | Klein et al. |
| 2015/0268648 | A1 | 9/2015 | Zhang et al. |
| 2015/0347114 | A1 | 12/2015 | Yoon |
| 2015/0348554 | A1 | 12/2015 | Orr et al. |
| 2015/0365480 | A1 | 12/2015 | Soto et al. |
| 2016/0075015 | A1 | 3/2016 | Izhikevich et al. |
| 2016/0099842 | A1 | 4/2016 | Krishnamoorthy et al. |
| 2016/0132563 | A1 | 5/2016 | Bhandari et al. |
| 2016/0154856 | A1 | 6/2016 | Olof-Ors |
| 2016/0226732 | A1 | 8/2016 | Kim et al. |
| 2016/0259308 | A1 | 9/2016 | Fadell et al. |
| 2016/0307539 | A1 | 10/2016 | Lee et al. |
| 2016/0357163 | A1 | 12/2016 | Marti et al. |
| 2016/0358443 | A1 | 12/2016 | True |
| 2016/0360344 | A1 | 12/2016 | Shim et al. |
| 2016/0378080 | A1* | 12/2016 | Uppala .................... G10L 15/22 700/275 |
| 2017/0004828 | A1 | 1/2017 | Lee et al. |
| 2017/0026692 | A1 | 1/2017 | Lee |
| 2017/0052514 | A1 | 2/2017 | Duong |
| 2017/0063611 | A1 | 3/2017 | Sheba et al. |
| 2017/0083220 | A1* | 3/2017 | Gao ..................... G06F 3/04847 |
| 2017/0097618 | A1 | 4/2017 | Cipollo et al. |
| 2017/0192409 | A1 | 7/2017 | Kim et al. |
| 2017/0230461 | A1 | 8/2017 | Verma et al. |
| 2017/0289766 | A1 | 10/2017 | Scott et al. |
| 2017/0357425 | A1* | 12/2017 | Smith .................. H04L 12/2816 |
| 2017/0357434 | A1* | 12/2017 | Coffman ................ G05B 15/02 |
| 2017/0357637 | A1* | 12/2017 | Nell ......................... G06F 40/35 |
| 2018/0084057 | A1 | 3/2018 | Wang |
| 2018/0091381 | A1* | 3/2018 | McLaughlin ....... H04L 12/2823 |
| 2018/0285065 | A1 | 10/2018 | Jeong |
| 2018/0322872 | A1 | 11/2018 | Cha et al. |
| 2018/0341618 | A1* | 11/2018 | Yuan ..................... H04L 67/535 |
| 2018/0343634 | A1* | 11/2018 | Yuan ..................... H04W 60/04 |
| 2018/0349447 | A1 | 12/2018 | MacCartney et al. |
| 2018/0367330 | A1 | 12/2018 | Kang et al. |
| 2019/0065975 | A1 | 2/2019 | White |
| 2019/0229943 | A1* | 7/2019 | Edwards ............. H04L 12/2829 |
| 2019/0279615 | A1 | 9/2019 | Ben-dor et al. |
| 2019/0281878 | A1 | 9/2019 | Tang et al. |
| 2019/0349213 | A1 | 11/2019 | Shive |
| 2019/0361575 | A1 | 11/2019 | Ni et al. |
| 2019/0394855 | A1* | 12/2019 | Meerbeek ........... H05B 47/115 |
| 2020/0098367 | A1 | 3/2020 | Shin |
| 2021/0105528 | A1 | 4/2021 | Van Os et al. |

FOREIGN PATENT DOCUMENTS

| | | |
|---|---|---|
| EP | 0562995 | 9/1993 |
| JP | 2010102163 | 5/2010 |
| JP | 2010534877 | 11/2010 |
| JP | 2015506133 | 2/2015 |
| JP | 2016111674 | 6/2016 |
| KR | 20130060109 | 6/2013 |
| KR | 20140079328 | 6/2014 |
| WO | 2009013641 | 1/2009 |
| WO | 2013081303 | 6/2013 |

OTHER PUBLICATIONS

Japanese Patent Office; First Office Action issued in Application No. 2020-562756; 12 pages; dated Oct. 24, 2022.
The Korean Intellectual Property Office; Notice of Office Action issued in Application No. 10-2020-7034906, 25 pages, dated Jul. 20, 2022.
Intellectual Property India; Examination Report issued in Application No. 202027048616; 7 pages; dated Dec. 7, 2021.
European Patent Office; Communication issue in Application No. 20200530.2; 11 pages; dated Dec. 4, 2020.
European Patent Office; Intention to Grant for Application No. 19707929.6 dated May 13, 2020.
European Patent Office; Communication Pursuant to Article 94(3) EPC issued in Application No. 19707929.6, 5 pages, dated Nov. 26, 2019.
European Patent Office; International Search Report and Written Opinion of Ser. No. PCT/US2019/016371; 26 pages; dated Jun. 11, 2019.
European Patent Office; Invitation to Pay Additional Fees for Ser. No. PCT/US2019/016371; 20 pages; dated Apr. 18, 2019.
Japanese Patent Office; Notice of Reasons for Rejection issued in Application No. 2020-562756; 10 pages; dated Mar. 20, 2023.
Japanese Patent Office; Decision to Grant issued for Application No. 2020-562756, 3 pages, dated Aug. 7, 2023.
European Patent Office; Decision to Grant issued for Application No. 20200530.2, 52 pages, dated Aug. 21, 2023.
Koren Patent Office; Notice of Office Action issued in Application No. 10-2023-7011521; 14 pages; dated Dec. 18, 2023.

(56) References Cited

OTHER PUBLICATIONS

China National Intellectual Property Administration; Notification of First Office Action issued in Application No. 201980039852.2; 22 pages; dated Jan. 24, 2024.

Lou, H.; Research on Key Technologies of Intelligent Human-Computer Interaction Assistant Based on Voice Control; Computer Products and distribution, No. 12; 4 pages; dated Dec. 15, 2017.

* cited by examiner

PROVIDING COMPOSITE GRAPHICAL ASSISTANT INTERFACES FOR CONTROLLING VARIOUS CONNECTED DEVICES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input.

Some automated assistants can be used to control internet of things ("IoT") devices. However, many IoT devices can come with their own corresponding applications. As a result, a user that has acquired multiple different IoT devices may be tasked with installing a variety of third party applications on their personal computing devices. Because applications can typically require memory, network bandwidth, updates, and/or other resources, having a variety of similar applications on a single device can be inefficient. Although a user may rely on an automated assistant to mediate interactions between the user and a particular IoT device, such interactions can frequently require spoken utterances from the user to be converted from audio to text. In order to effectuate conversion of audio to text, audio data oftentimes must be sent over a network, thereby consuming significant network bandwidth. Furthermore, mediating interactions in such a way can prove unreliable when a user is surrounded by other people that are talking, or is otherwise in environment with background noise. As a result, a dialog session between a user and an automated assistant may waste computational resources and network resources when requests for various IoT devices to perform particular functions are ultimately not identified, or otherwise not fulfilled.

SUMMARY

The present disclosure is generally directed to methods, apparatus, and computer-readable media (transitory and non-transitory) for providing composite graphical assistant interfaces through which to control multiple different devices. The composite graphical assistant interface can be used to control a variety of different devices, despite the different devices being manufactured by different third parties. In this way, a user does not necessarily have to install multiple different third party applications to control their respective IoT devices. Rather, a user can rely on their automated assistant to recognize particular contexts in which a user would like to control a particular IoT device, and to provide a composite graphical assistant interface that includes suggestions for particular IoT devices to control.

For example, a user can enter their kitchen, which can include a variety of different devices, such as a client device that provides access to an automated assistant, and various connected devices that are in communications with the client device. The connected devices can include a stereo system, an oven, smart lights, and a coffeemaker. Each of the connected devices can be manufactured by different third party manufacturers, at least relative to the manufacturer of the automated assistant. Typically in the morning when the user enters the kitchen, the user can provide a command such as, "Assistant, turn on the lights in the kitchen." The user may then access a variety of applications or manually interact with the connected devices in order to cause other functions to be performed. Although the user could verbally initialize the automated assistant to cause each function to be performed (e.g., "Assistant, turn on the coffeemaker. . . . Assistant, play some music"), this would necessitate additionally speech processing, thereby consuming computational and network resources. Furthermore, if the user was required to access a different application to control each device, each application may require some amount of network connectivity, thereby further inefficiently consuming computational and network resources. In order to provide a more efficient use of such resources, the automated assistant can provide a composite graphical assistant interface in response to receiving an initial request to perform a function and/or in response to a user selection at a particular assistant interface.

For example, in response to receiving a spoken utterance such as, "Assistant, turn on the kitchen lights," the automated assistant can identify a current status of other connected devices within the kitchen in order to identify particular functions to recommend to the user. For instance, if the coffeemaker in the kitchen is determined to be on at the time the spoken utterance is received, the automated assistant can omit any reference to the coffeemaker in the composite graphical assistant interface being compiled. In this way, the automated assistant would not be making a redundant suggestion, and can make room on the composite graphical assistant interface for more suitable suggestions. Additionally, if the automated assistant determines that the stereo system in the kitchen is not currently playing music, the automated assistant can determine a function to suggest to the user for controlling the stereo system. For instance, the automated assistant can provide a composite graphical assistant interface that includes a graphical control element for turning on the stereo system and/or changing a volume of the stereo system. The composite graphical assistant interface can be provided at a display panel that is integral to the client device, or at a display panel that is associated with the client device (e.g., a tablet device that is also located in the kitchen). In this way, the user has a less computationally intensive modality through which to turn on the stereo system, and the modality can be provided to the user in a timely manner in response to their initial spoken utterance.

In some implementations, a suggestion for a particular function to be performed by a connected device can be based on data that indicates a historical inclination of the user to interact with particular connected devices within particular contexts. For example, the user can have a historical inclination to turn on their stereo system when their kitchen lights are on, or shortly after their kitchen lights are requested to be on. When such a context subsequently arises, the automated assistant can provide a composite graphical assistant interface that includes a graphical control element for controlling the stereo system at a display panel within the kitchen, or at another suitable display panel. Furthermore, the automated assistant can identify other connected devices that are associated with the user, the request from the user, the context of the request, and/or any other information associated with the user, in order to provide further suggestions at the composite graphical assistant interface. For instance, the user can also have a historical inclination to pre-heat their kitchen oven at night, after turning on the kitchen lights and the music from the stereo system. When such a context subsequently arises, the automated assistant can provide a composite graphical assistant interface that includes a graphical control element for controlling one or more functions of their oven, such as a bake temperature and a timer setting, as well as graphical control elements controlling features of their kitchen lights and/or stereo system. In this way, the composite graphical assistant interface generated by the automated assistant can provide controls for a variety of different connected devices that are made by a variety of different manufacturers.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
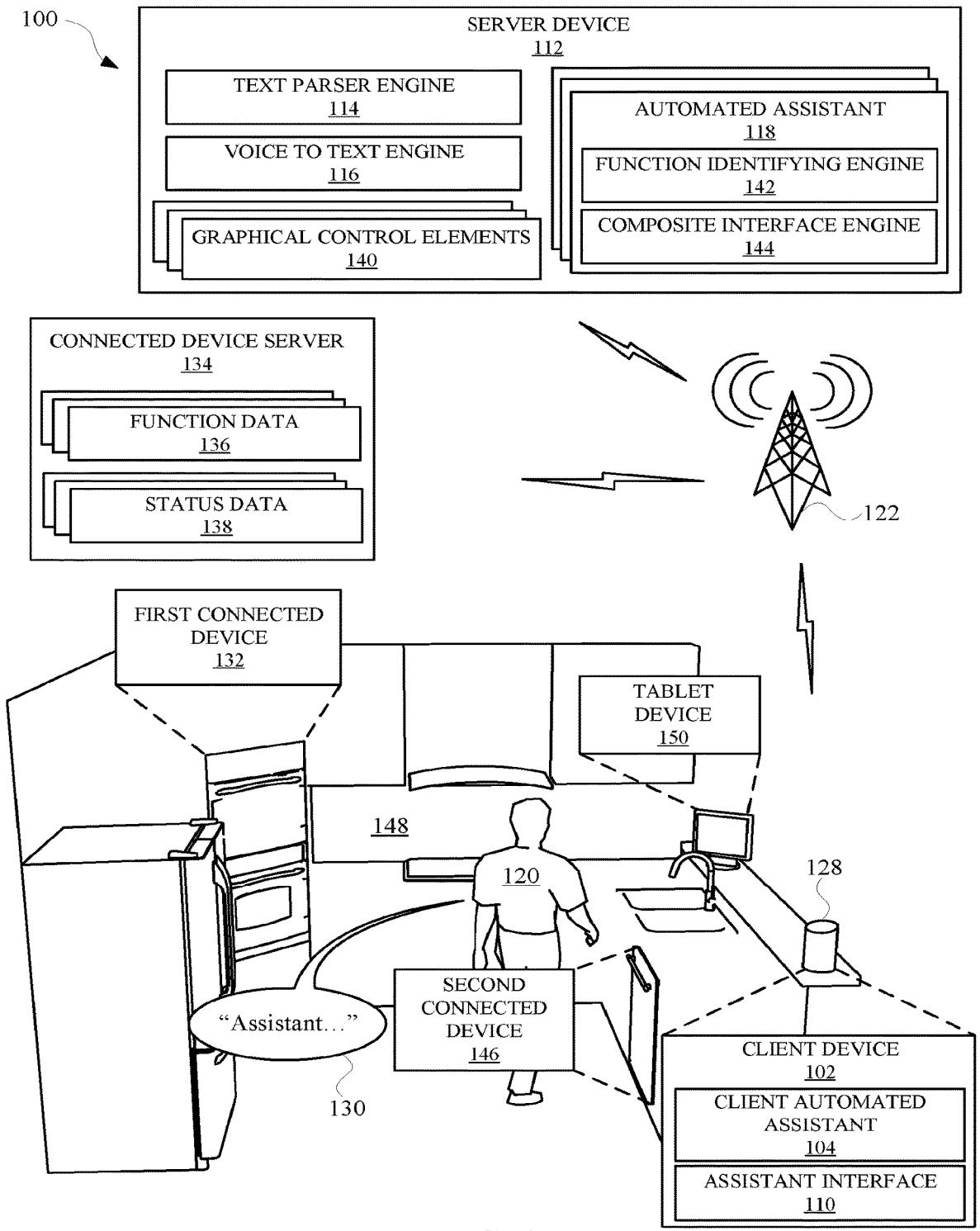
FIG. 1 illustrates a system for providing composite graphical assistant interfaces for interacting with connected devices.

FIG. 1 illustrates a system 100 for assembling composite graphical assistant interfaces for interacting with connected devices. A composite graphical assistant interface can be generated in part by an automated assistant 118 that is provided at one or more computing devices, such as a client device 102 (e.g., an assistant device 128), an additional client device (e.g., a tablet device 150) and/or a server device 112. A user 120 can interact with a client automated assistant 104 via an assistant interface 110, which can be a microphone, a camera, a touch screen display, a user interface, and/or any other apparatus capable of providing an interface between a user and an application. For instance, a user 120 can initialize the client automated assistant 104 by providing a verbal, textual, and/or a graphical input to the assistant interface 110, and/or the tablet device 150, to cause the client automated assistant 104 to perform an operation (e.g., provide data, control a peripheral device, access an agent, etc.). The client device 102 can include a display device, which can be a display panel that includes a touch interface for receiving touch inputs and/or gestures for allowing a user to control applications of the client device 102 via the touch interface. Alternatively, the client device 102 can be an assistant device 128 that does not include a display panel, but nonetheless provides one or more interfaces through which the user 120 can interact with the client automated assistant 104 (e.g., through spoken utterances provided by the user 120 to a microphone at the assistant device 128).

The client device 102 can be in communication with the server device 112 over a network 122, such as the internet. The client device 102 can offload computational tasks to the server device 112 in order to conserve computational resources at the client device 102 and/or in order to leverage more robust resources at the server device 112. For instance, the server device 112 can host the automated assistant 118, and the client device 102 can transmit inputs received at one or more assistant interfaces to the server device 112. However, in some implementations, the automated assistant 118 can be entirely hosted at the client device 102. In various implementations, all or less than all aspects of the client automated assistant 104 can be implemented on the client device 102. In some of those implementations, aspects of the automated assistant 118 are implemented via the client automated assistant 104 of the client device 102 and interface with the server device 112, which implements other aspects of the client automated assistant 104. The server device 112 can optionally serve a plurality of users and their associated assistant applications via multiple threads. In some implementations where all or less than all aspects of the automated assistant 118 are implemented via a client automated assistant 104 of the client device 102, the client automated assistant 104 can be an application that is separate from an operating system of the client device 102 (e.g., installed "on top" of the operating system)—or can alternatively be implemented directly by the operating system of the client device 102 (e.g., considered an application of, but integral with, the operating system).

In some implementations, the server device 112 can include a voice to text engine 116 that can process audio data received at an assistant interface 110 to identify the text embodied in the audio data. The process for converting the audio data to text can include a speech recognition algorithm, which can employ neural networks, word2vec algorithms, and/or statistical models for identifying groups of audio data corresponding to words or phrases. The text converted from the audio data can parsed by a text parser engine 108 and made available to the automated assistant

104 as textual data that can be used to generate and/or identify command phrases from the user and/or a third party application.

The user 120 can interact with a first connected device 132 and/or a second connected device 146 using their client device 102 and/or client automated assistant 104. Each connected device can be one or more IoT devices, which can be connected to or in communication with the client device 102 and/or the tablet device 150 over a local area network and/or a wide area network. For instance, the client device 102, the tablet device 150, the first connected device 132, and/or the second connected device 146 can be connected to a Wi-Fi network in a home or other environment. In order for the user 120 to interact with the first connected device 132, the user 120 can initialize an application associated with the first connected device 132. However, if the user 120 frequently interacts with multiple different connected devices, the user 120 may be required to operate a variety of different applications in order to control each connected device. In order to more efficiently use computational resources, and prevent wasting network bandwidth, the client automated assistant 104 and/or the automated assistant 118 can provide a composite graphical assistant interface from which the user can interact with one or more different connected devices (e.g., the first connected device 132 and the second connected device 146).

In order for the composite graphical assistant interface to be generated and/or provided, the user 120 can provide a spoken utterance 130 to the assistant interface 110. The spoken utterance can embody a request that indicates the user 120 would like the first connected device 132 to perform a particular function. Audio data corresponding to the spoken utterance 130 can be transmitted from the client device 102 to the server device 112. The audio data can then be processed by the voice to text engine 116 and by the text parser engine 114. Text resulting from the processing of the audio data can be used by a function identifying engine 142 in order to identify one or more functions with which the user 120 is referring to in their spoken utterance 130. For instance, the function identifying engine 142 can compare the text from the spoken utterance 130 to function data 136 made available at a connected device server 134. The function data 136 can provide a comprehensive list of functions that one or more connected devices (e.g., the first connected device 132 and the second connected device 146) are capable of performing. The function identifying engine 142 can compare the text to the function data 136 in order to identify one or more functions capable of being performed by the first connected device 132 and that the user is referring to. Function data 136 can additionally or alternatively be stored locally relative to the server device 112.

In response to determining that the text corresponds to one or more functions, the automated assistant 118, or the client automated assistant 104, can cause the first connected device 132 to perform the one or more identified functions. For example, when the first connected device 132 is an IoT device, such as, but not limited to, an oven, a function can include pre-heating the oven to a particular temperature. A command for causing the function to be performed at the first connected device 132 can be provided from the server device 112 to the first connected device 132. Alternatively, the command for causing the first connected device 132 to perform the function can be provided from the server device 112 to the connected device server 134, which can communicate with the first connected device 132 to cause the first connected device 132 to perform the function. Alternatively, the client device 102 can communicate the command to the first connected device 132, or the server device 112 can communicate the command to the client device 102, which can communicate with the first connected device 132 to cause the first connected device 132 to perform the function.

In response to receiving the spoken utterance 130 to cause the first connected device 132 to perform the function, the automated assistant can cause a composite graphical assistant interface to be provided at a display device (e.g., a tablet device 150, television, laptop, cellphone) associated with the client device 102. In order to generate the composite graphical assistant interface, the automated assistant 118 can identify, from the function data 136, one or more other functions capable of being performed by the first connected device 132. In some implementations, in response to determining that the spoken utterance 130 was received at the client device 102, the automated assistant can determine one or more other functions capable of being performed by a second connected device 146 (e.g., a different IoT device), the tablet device 150, and/or any other device that is associated with the client device 102. For instance, the function data 136 can include one or more lists of functions that corresponds to devices associated with the user 120, the client device 102, and/or the first connected device 132. The automated assistant can determine the one or more functions in order to provide suggestions or recommendations for other functions that the user 120 might want to be performed, at least in view of their request to cause the first connected device 132 to perform a function.

For instance, in some implementations, a profile for a user can be identified based on voice characteristic of a spoken utterance received at the assistant interface 110. The profile can indicate preferences associated with each of a plurality of particular connected devices that are associated with a user, such as preferences learned based on historical interactions of the user with the connected device(s). Furthermore, the profile can identify a group of connected devices that the user 120 prefers to interact with simultaneously, sequentially, and/or within a particular context or contexts. For instance, the user 120 can request that the automated assistant cause the first connected device 132 to perform a first function and the second connected device 146 to perform a second function, and the profile can identify the first function and the second function as related based on, for example, having occurred one or more times in temporal proximity to one another. Thereafter, when the user 120 is interacting with the automated assistant to cause the first connected device 132 to perform the first function, the automated assistant can access the profile to identify the second function based on its stored relation with the first function, and provide the user 120 with a selectable suggestion for causing the second connected device 146 to perform the second function.

In some implementations, historical interactions between the user 120 and the automated assistant can be processed, with permission from the user 120, to determine a historical inclination of the user 120 to interact with particular connected devices in particular contexts. For instance, the user 120 can have a history of interacting with two IoT devices in the morning, therefore the automated assistant can be put on notice that, when the user 120 is interacting with at least one of the two IoT devices in the morning, the user 120 will be inclined to interact with the other IoT device, at least until the morning is over. Additionally, or alternatively, the automated assistant can provide suggestions based on a location of the user 120. For instance, a user 120 can have a history of causing their oven (e.g., the first connected device 132) to perform a first function and their tablet device 150 to perform a second function when the user 120 is in their kitchen 148. Therefore, when the user 120 causes the first connected device 132 to perform the first function, and the user 120 is determined to be in the kitchen 148, the automated assistant can cause a selectable suggestion element to be provided at a composite graphical assistant interface. The selectable suggestion element can operate as a suggestion for the user 120 to cause the second function to be performed at the second connected device 146. The user can be determined to be in the kitchen 148 based on, for example, the client device 102 or tablet device 150 being utilized by the user to perform the first function. "Kitchen" can optionally be identified as an explicit location based on, for example, device 102 and/or device 150 being assigned a label for kitchen 148. Alternatively, a location of the user can more generally be a location corresponding to the client device 102 or tablet device 150. In some implementations, the context can be whether the user 120 is participating in a particular event, such as one that is identified in calendar data that is accessible to the automated assistant. In some implementations, the context can be whether one or more other users, different from the user 120, are present at a particular location.

When the automated assistant has identified other functions with which to suggest to the user 120, the identified other functions can be used as a basis from which to identify graphical control elements 140. For instance, a function such as turning on and off a fan can be controlled by a graphical control element 140 corresponding to a two-way switch. Furthermore, a function such as adjusting a temperature of an oven or a volume of music can be controlled using a graphical control element 140 corresponding to a dial, which can be turned to select a value of a range of values. The automated assistant 118 or client automated assistant 104 can map the identified other functions to the graphical control elements 140, which can be stored at or otherwise accessible to the server device 112.

A composite interface engine 144 can map the graphical control elements 140 to the identified other functions in order to generate the composite graphical assistant interface. In some implementations, the automated assistant 118 can access status data 138 corresponding to a status of the first connected device 132. The status data 138 can indicate device statuses, which can be affected by performance or non-performance of one or more functions of the first connected device 132 and/or the second connected device 146. For example, a status of the first connected device 132 can be "off" when no function of the first connected device 132 is being performed. Alternatively, a status can correspond to a table or string of data that indicates a condition(s) or parameter(s) of particular functions of the first connected device 132 and/or the second connected device 146. A status for each of the first connected device 132 and the second connected device 146 can be used as a basis from which to determine configurations for each graphical control element 140 that has been mapped to a function of the first connected device 132 and the second connected device 146. For example, if the first connected device 132 includes heating element that is in an off state, and a function of the first connected device 132 is to turn on the heating element, a graphical control element corresponding to a two-way switch can be provided at the composite graphical assistant interface and configured in a way that shows the heating element being off. In other words, each graphical control element can reflect each current state of the first connected device 132 and the second connected device 146 when the composite graphical assistant interface is presented at the tablet device 150.

In some implementations, an arrangement and/or a selection of the graphical control elements for the composite graphical assistant interface can be based on data associated with interactions between the user 120 and the automated assistant and/or the first connected device 132. For example, a particular group of graphical control elements corresponding to a particular group of functions can be selected for a composite graphical assistant interface based on a user having previously caused such functions to be performed within a threshold period of time. Alternatively, or additionally, the particular group of graphical control elements corresponding to a particular group of functions can be selected for a composite graphical assistant interface based on how a function affects a particular user, a particular location, particular device(s), and/or any other relationship that can be exhibited by functions of a device. For example, a composite graphical assistant interface generated for a user can include graphical control elements corresponding to functions of multiple different connected devices that affect a home in which the user 120 is currently located. Therefore, the selection of the graphical control elements can be based on the location of the user, an identifier for the connected device, a calendar schedule of the user, and/or any other data that can be used to estimate geolocation data for the user.

In some implementations, the user 120 can provide a spoken utterance 130 to an assistant device 128 that lacks an integrated display panel or otherwise cannot readily present a composite graphical assistant interface at the assistant device 128. In such implementations, the automated assistant can receive the spoken utterance 130 at the assistant device 128 and cause a function requested by the user 120 to be performed by the first connected device 132. However, in response to receiving the request to perform the function and determining that a display panel is not available at the assistant device 128, the automated assistant can identify one or more candidate devices. The candidate devices can be identified based on their ability to display an assistant interface, their proximity to the user 120, their proximity to the assistant device 128, their proximity to the first connected device 132, and/or a preference of the user 120 for a particular candidate device. For instance, when the automated assistant determines that a display panel is not available at the assistant device 128 and determines that a tablet device 150 or television is the next most proximate display device to the assistant device 128, the automated assistant can cause the tablet device 150 or the television to present the composite graphical assistant interface. In this way, because the user 120 may not always be near a display panel when they are requesting a particular function be performed by a connected device, the automated assistant can still cause the composite graphical assistant interface to be generated at a nearby display device. In some implementations, the automated assistant can cause the assistant device 128 to audibly notify the user 120 of the location of the composite graphical assistant interface in response to the user 120 providing the request for the connected device 132 to perform a function. For instance, in response to the user 120 providing the spoken utterance, "Assistant, please preheat my oven," the automated assistant can cause the assistant device 128 to audibly output the response, "Ok, I've provided an interface with additional controls at your tablet device." The automated assistant can therefore put the user 120 on notice that they can find additional controls for the first connected device 132 and the second connected device 146 if they go retrieve their tablet device.

Figure 2A:
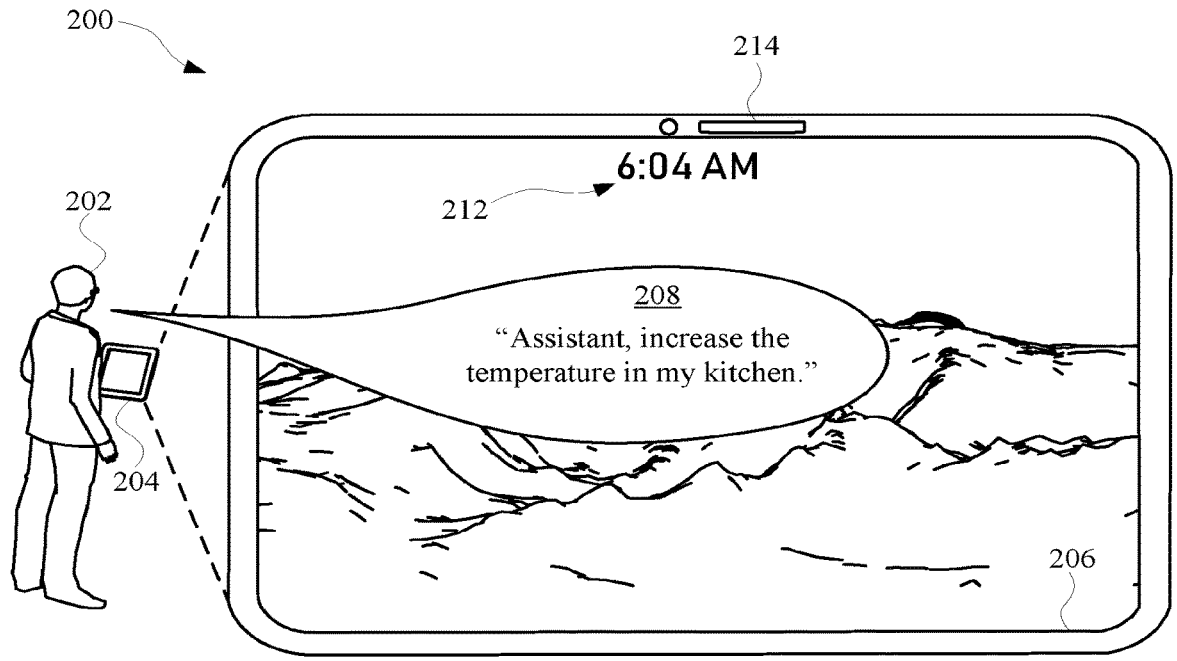
FIG. 2A and FIG. 2B illustrate views of a composite graphical assistant interface being provided with multiple different graphical control elements for controlling multiple different connected devices.
Figure 2B:
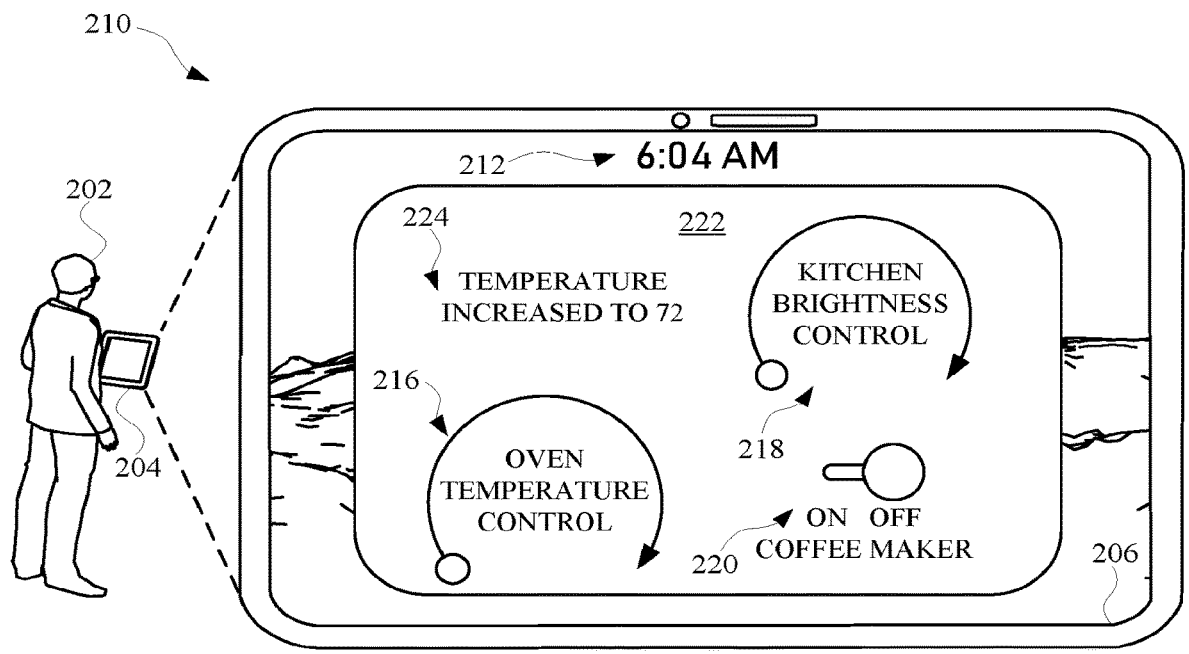

FIGS. 2A and 2B illustrate views 200 and 210 of a composite graphical assistant interface 222 being provided with multiple different graphical control elements for controlling multiple different connected devices. The composite graphical assistant interface 222 can be provided to a user 202 in response to the user 202 providing a spoken utterance 208 to an automated assistant via an automated assistant interface 214. The automated assistant interface 214 can be, for example, at least a microphone capable of providing a signal in response to a user 202 providing an audible spoken utterance 208 to the automated assistant interface 214. For instance, the spoken utterance 208 can be, "Assistant, increase the temperature in my kitchen." In response to receiving the spoken utterance 208, the automated assistant can determine the function and/or the connected device with which the user 202 is seeking to interact, and can cause the connected device to perform the function the user 202 is requesting be performed. For example, in response to receiving the spoken utterance 208, the automated assistant can cause a thermostat in the home of the user 202 to adjust a temperature of at least the kitchen of the home.

In order to mitigate unnecessarily processing subsequent spoken utterances provided from the user 202, and thereby preserve computational and network resources, the automated assistant can cause function suggestions to be provided at a display panel 206 of a client device 204, or a separate device. For instance, in response to receiving the spoken utterance 208, the automated assistant, the client device 204, and/or a remote server device, can access data from which to provide recommendations for controlling other functions of other connected devices. A connected device can be a device that is linked to, or otherwise, capable of being in communication with the client device 204 and/or the automated assistant. The data can provide information about a status of each connected device, and the suggestions provided at the composite graphical assistant interface 222 can be based on particular statuses of particular connected devices. For instance, a status of the kitchen lights at the time the user 202 provided the spoken utterance 208 can be "off," therefore, because the user 202 has expressed interest in changing the environment of the kitchen, the user 202 may also be interested in changing a status of the lights in the kitchen. Specifically, the lights in the kitchen can have non-binary parameters associated with their brightness, therefore, in response to determining the user 202 may also be interested in adjusting the kitchen lights, the automated assistant can select a dial graphical control element, which can act as a kitchen brightness control 218.

In some implementations, the kitchen brightness control 218 can be selected for the composite graphical assistant interface 222 based on the kitchen lights being within a common location as the kitchen, which the user 202 explicitly expressed interest in changing the temperature of. Alternatively, or additionally, the kitchen brightness control 218 can be selected for recommending to the user 202 at the composite graphical assistant interface 222 based on a historical inclination of the user 202 to modify the kitchen temperature and the kitchen lights within a particular context. The historical inclination of the user 202 can be indicated as part of a user profile or preference data that characterizes the inclination based on previous interactions between the user 202 and the automated assistant, and/or the user 202 and one or more connected devices. In some implementations, such interactions can occur within a particular context, such as a particular time 212 (e.g., after 6:00 AM), therefore the automated assistant can generate the composite graphical assistant interface 222 based on the particular context. Alternatively, or additionally, the context can be characterized by one or more statuses of one or more respective connected devices.

Alternatively, or additionally, the automated assistant can identify a request from the user and compare the request to available data (e.g., preference data and/or historical interaction data) to determine one or more functions to suggest to the user. When the automated assistant has identified the one or more functions to suggest, the automated assistant can identify each connected device corresponding to each function of the one or more identified functions. A status of each connected device can then be determined in order to ensure that a suggestion for a function to perform is not redundant, or would result in a status of a connected device not changing. For example, a user can typically turn on their kitchen lights in the morning, and subsequently turn on their coffee maker. In such scenarios, the automated assistant can provide a spoken utterance to initialize the automated assistant to cause the kitchen lights to turn on (e.g., "Assistant, turn on my kitchen lights"). Based on data that indicates the historical interactions wherein the user turns on both the kitchen lights and the coffee maker, the automated assistant can identify the coffeemaker and/or a function for turning on the coffeemaker, in response to receiving the request to turn on the kitchen lights. In order to ensure that a function suggestion is not inconsequential, the automated assistant can compare a current status of the coffeemaker to a status that the user typically desires for the connected device when the user turns on the kitchen lights. If the current status of the coffeemaker reflects the desired status, the automated assistant can omit providing a graphical control element at a composite graphical assistant interface for controlling the coffeemaker. However, if the current status of the coffeemaker does not reflect the desired status (e.g., the coffeemaker is off, and is therefore not exhibiting the desired status), the automated assistant can select a graphical control element for controlling the function that turns the coffeemaker on. In this way, the composite graphical assistant interface can be optimized to provide graphical control elements that will effectuate changes that a user would typically desire, rather than providing suggestions to connected devices that may have already occurred.

For example, the composite graphical assistant interface 222 can include a variety of different graphical control elements that are selected for the composite graphical assistant interface 222 based on a status of the particular connected device to which they correspond. For instance, because the user 202 has solicited the automated assistant to turn the temperature of the kitchen up, the automated assistant can identify other connected devices in the kitchen that the user may have an interest in controlling, such as an oven and/or a coffee maker. Because each of these connected devices are off (as indicated by a configuration of an oven temperature control 216 and a coffee maker control 220), these connected devices can be candidate connected devices for control suggestions. Furthermore, the user 202 can have a history of increasing the temperature of the kitchen, adjusting the lights in the kitchen, pre-heating their oven, and turning on their coffee maker, all within a threshold range of time after 6:00 AM. Despite each of these devices and/or their respective control applications being provided by different third parties, the automated assistant can compile the composite graphical assistant interface 222 in order to allow the user 202 to control each device from a single interface.

In some implementations, as a result of the user 202 selecting one of the graphical control elements at the composite graphical assistant interface 222, a status of a corresponding connected device can be changed. For instance, initially the brightness of the kitchen lights is indicated as "off," at least based on the kitchen brightness control 218 being at a lowest level. When the user 202 adjusts the kitchen brightness control 218 to a higher level, a status of the kitchen lights can be updated to have an "on" status. Furthermore, the status of the kitchen lights can be updated to reflect a particular slot value generated in response to the adjustment of the graphical control element. For instance, the slot value can be "60%," indicating that the kitchen brightness control 218 was adjusted up to 60%, therefore the status of the kitchen lights can be updated to be "kitchen lights: status(lights[on], brightness[60], hue[nul/])." Thereafter, any other subsequent suggestions can be based the updated status of the kitchen lights. For instance, because the kitchen lights now have a status of being "on," the automated assistant can cause the composite graphical assistant interface 222 to provide a graphical control element for modifying the hue of the kitchen lights, at least based on the kitchen lights being on, and the "hue" parameter of the kitchen lights being "null" or in a default setting.

In some implementations, the composite graphical assistant interface 222 can offer a status indication 224 of the function performed in response to the user 202 providing the spoken utterance 208. Furthermore, in response to receiving the spoken utterance 208, the automated assistant can cause the composite graphical assistant interface 222 to provide a suggestion that is embodied as natural language that characterizes a spoken utterance. The spoken utterance can be one that, when provided to the automated assistant interface, initializes the automated assistant to cause one or more connected devices to perform one or more functions. For instance, in response to receiving the spoken utterance 208, the automated assistant can identify a status of a connected device located within an area affected by the spoken utterance 208 (e.g., the kitchen). The automated assistant can then identify a natural language input that, when received at the automated assistant interface, would initialize the automated assistant to cause the connected device to perform a function. For example, when the connected device is a coffeemaker, the automated assistant can identify a previously employed spoken utterance for controlling the coffeemaker such as, "Assistant, turn on the coffeemaker." In response to identifying the aforementioned spoken utterance, the automated assistant can cause the graphical assistant interface 222 to present the spoken utterance as a selectable suggestion element that includes at least the text "turn on the coffeemaker." In this way, the user 202 can either select the selectable suggestion element to turn on the coffeemaker, or speak the text as a spoken utterance in order to initialize the automated assistant to cause the coffeemaker to turn on. The automated assistant can also retrieve command data that can be used by the client device 204 to interact with a particular connected device. In this way, as the automated assistant decides on the particular suggestions to make to the user 202, the automated assistant can also locally provide data that will allow a suggested function to be executed by a connected device. As a result, the automated assistant and/or the client device will not necessarily have to communicate with a remote server, in response to a user selection of a suggestion, to get additional information about how to cause the connected device to perform the function.

Figure 3A:
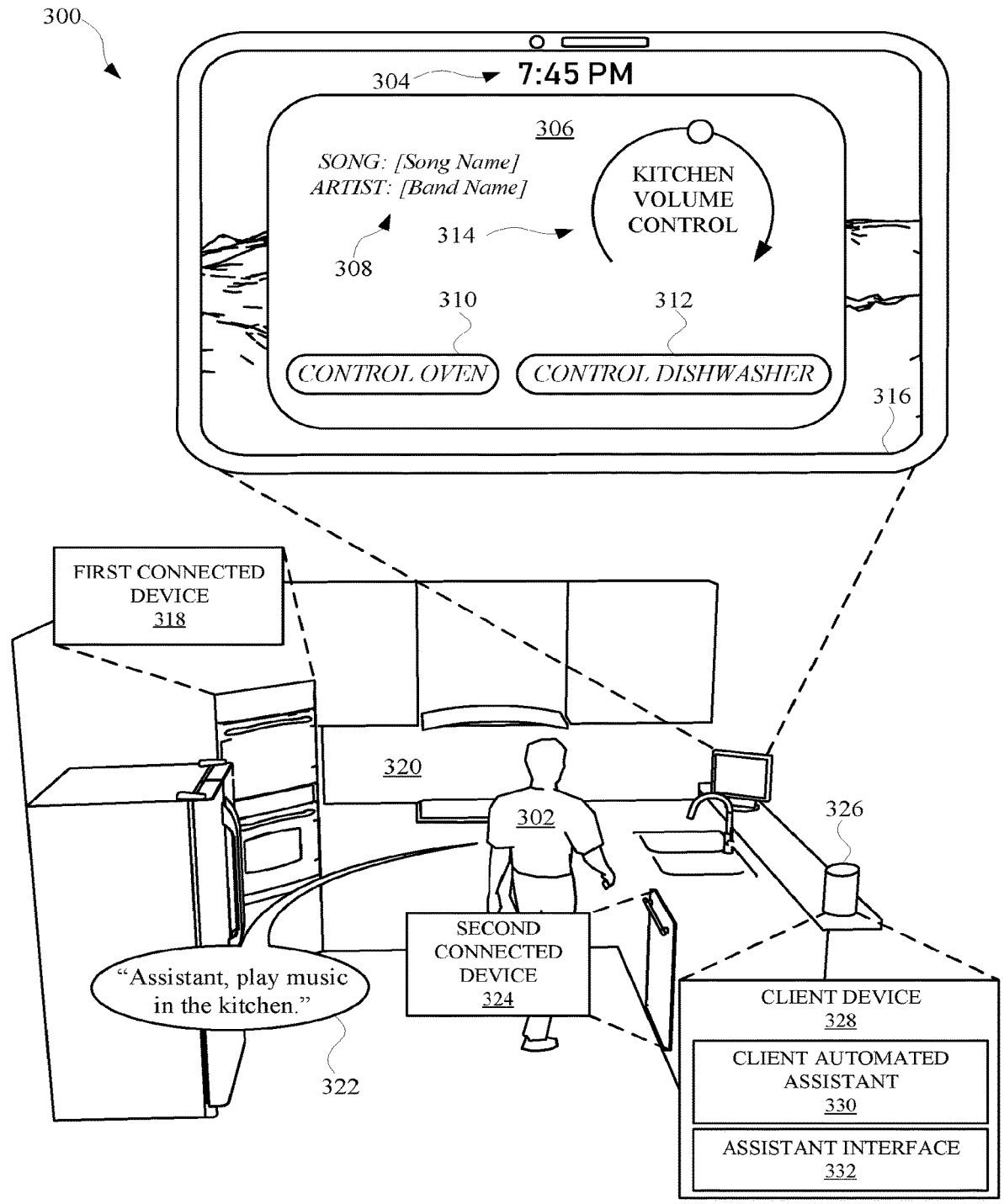
FIG. 3A and FIG. 3B illustrate views of a user being provided suggestions for controlling one or more connected devices based on an interaction between the user and an automated assistant, and/or a current status of one or more connected devices.
Figure 3B:
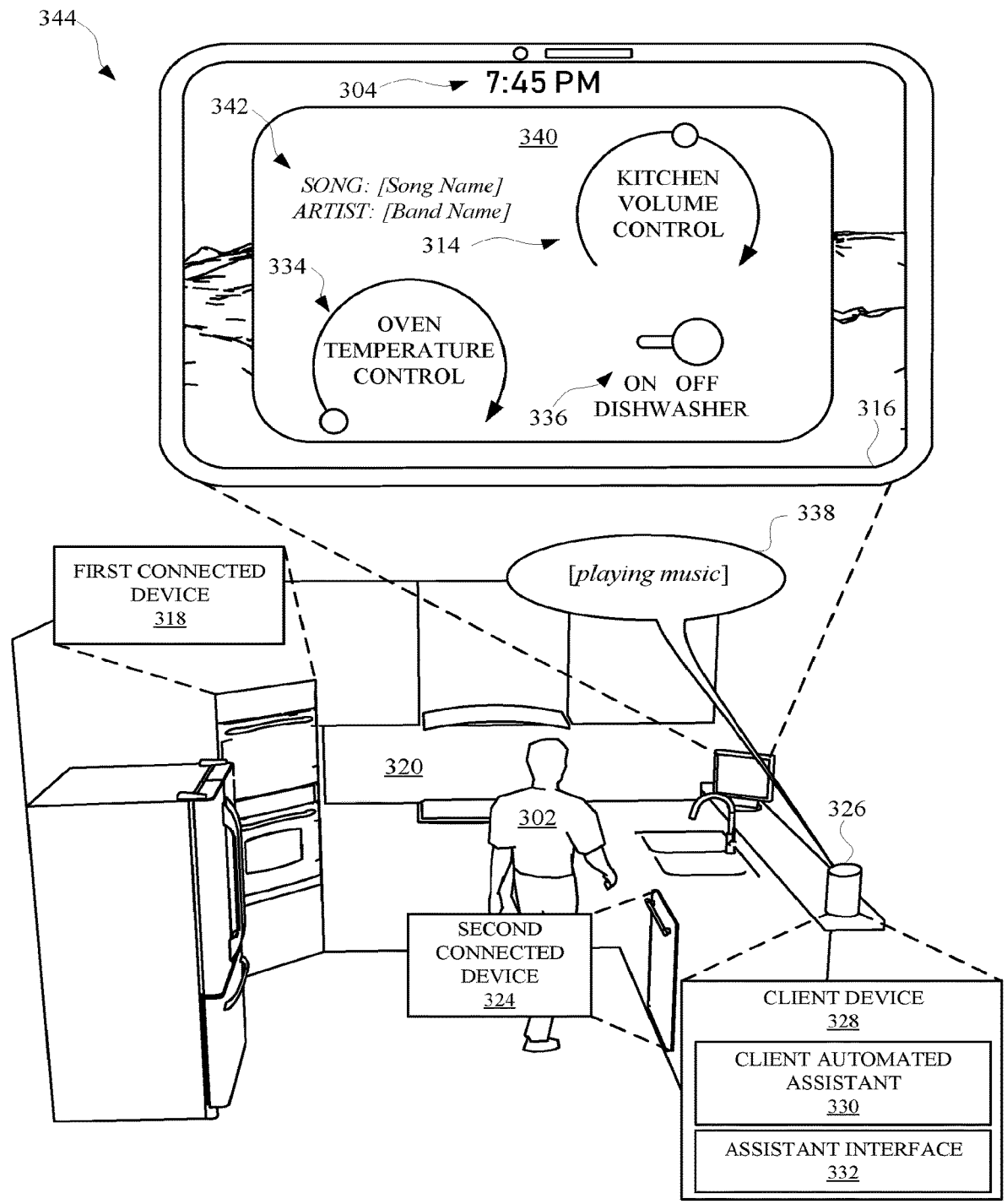

FIGS. 3A and 3B illustrate views 300 and 344 of a user 302 being provided suggestions for controlling one or more connected devices based on an interaction between the user 302 and an automated assistant, and/or a current status of one or more connected devices. For instance, the user 302 can walk into their kitchen 320 and initialize a client automated assistant 330 via an assistant interface 332 of a client device 328 (e.g., an assistant device 326). The user 302 can initialize the client automated assistant 330 by providing a spoken utterance 322 such as, "Assistant, play music in the kitchen." The client automated assistant 330 can receive the spoken utterance 322 and cause the spoken utterance 322 to be processed at the client device 328, or a separate remote server, in order to identify an action or function the user 302 wishes to be performed. Because the client device 328 does not include a display panel, the client device 328 can access a device topology to determine a suitable device through which to provide a composite graphical assistant interface 306 from which to further control any functions associated with the requested function (i.e., playing music), and/or any other functions associated with other connected devices identified in the device topology.

For instance, a stored device topology accessible to the client automated assistant 330 can identify a tablet device 316, a first connected device 318, and a second connected device 324 within a device topology that identify devices in the kitchen 320. The device topology can further identify the tablet device 316 as being the only device with a display panel, therefore any composite graphical assistant interface to be presented to the user 302 while they are in the kitchen 320 can be provided at the tablet device 316. Furthermore, in order to generate a suitable composite graphical assistant interface, the automated assistant can identify a status of each connected device and/or determine a historical inclination of the user 302 to interact with one of the connected devices after the requested function (i.e., playing music) is performed. For instance, because a current status of the first connected device 318 (e.g., an oven) is off, the automated assistant can suggest that the user control the oven by presenting a selectable suggestion element 310 at the composite graphical assistant interface 306. Furthermore, because a current status of a second connected device 324 (e.g., a dishwasher) is off, the automated assistant can suggest that the user control the dishwasher by presenting a selectable suggestion element 312 at the composite graphical assistant interface 306. Moreover, the automated assistant can determine whether there are any other functions associated with the initially requested function of playing music and provide a graphical control element at the composite graphical assistant interface 306 for controlling the other function. For instance, the function of turning on music, which can be performed by the client automated assistant 330 at the client automated assistant 330, can cause a status of the client device to be at least, "client_device: status(music[on], volume[default])." In response to a parameter of the client device 328 being in default mode, the automated assistant can provide a graphical control element for controlling the corresponding parameter. For instance, the automated assistant can provide a kitchen volume control 314, in order to control the volume of the music in the kitchen 320. However, if the user 302 did not provide the previous request corresponding to turning on music, the automated assistant can omit the kitchen volume control 314 from the composite graphical assistant interface 306.

FIG. 3B can illustrate a view 344 of a different composite graphical assistant interface 340 provided by the automated assistant in response to the user 302 selecting a selectable suggestion element at the composite graphical assistant interface 306 of FIG. 3A. For instance, in response to the user 302 selecting the "control oven" selectable suggestion element 310, the automated assistant can provide a different composite graphical assistant interface 340 that includes a dial 334 for setting an oven temperature. An initial configuration of the dial 334 can be at "0" in order to reflect a current status of the first connected device 132, and/or one or more current parameters of the first connected device 132. For instance, a current status of the first connected device 132 can be, "oven: status(power[off], temperature[0])," therefore the configuration of the dial 334 can reflect multiple current parameters of the first connected device 318. In other words, the dial 334 being at its lowest state indicates that the oven is off and hence, the temperature is set to 0. Such parameters can be consolidated and reflected at a single graphical control element in order to preserve space in the composite graphical assistant interface 340, and provide a more intuitive modality through which to provide more information to the user 302. If the user 302 had selected the "control dishwasher" selectable suggestion element 312, a switch 336 can be presented at the different composite graphical assistant interface 340, based on the particular second connected device 324 having a current status of "off," and a single parameter to control (on or off). In some implementations, metadata corresponding to the requested function, or a status of the requested function (e.g., play music) can be presented as a status indication 342. In this way, the user 302 does not necessarily have to invoke the automated assistant again to determine a current status associated with their request, nor does the user 302 have to swap between different interfaces in order to determine such information. Rather, the automated assistant metadata can be presented with graphical control elements associated with other third party devices, in order to provide a consolidated interface that will reduce the wasting of computational and network resources.

In some implementations, because a current status of another connected device in the kitchen indicate that parameters associated with the other connected device have been set, the automated assistant can omit providing a graphical control element for that connected device. For instance, if a current status of the kitchen lights is "on" when the user 302 provides the spoken utterance 322, the automated assistant can acknowledge the current status of the kitchen lights, and omit suggesting a function for turning off the lights. Such omissions can be based on one or more statuses of one or more devices in the kitchen or other areas of the home, and/or a historical inclination of the user 302 to not turn off their lights when they request music to be played in the kitchen. In some implementations, identifying the historical inclination can be based on a voice characteristic of the user 302, which allows the automated assistant to identify data associated with a specific user to be processed in order to make suitable suggestions for the user or users. In some implementations, the inclusion or omission of a particular graphical control element can be based on a particular context with which the user provided the spoken utterance 322, such as after or before a particular time 304, or within a threshold time period relative to a particular time, a geographic location, an event, and/or a presence of one or more users.

Figure 4A:
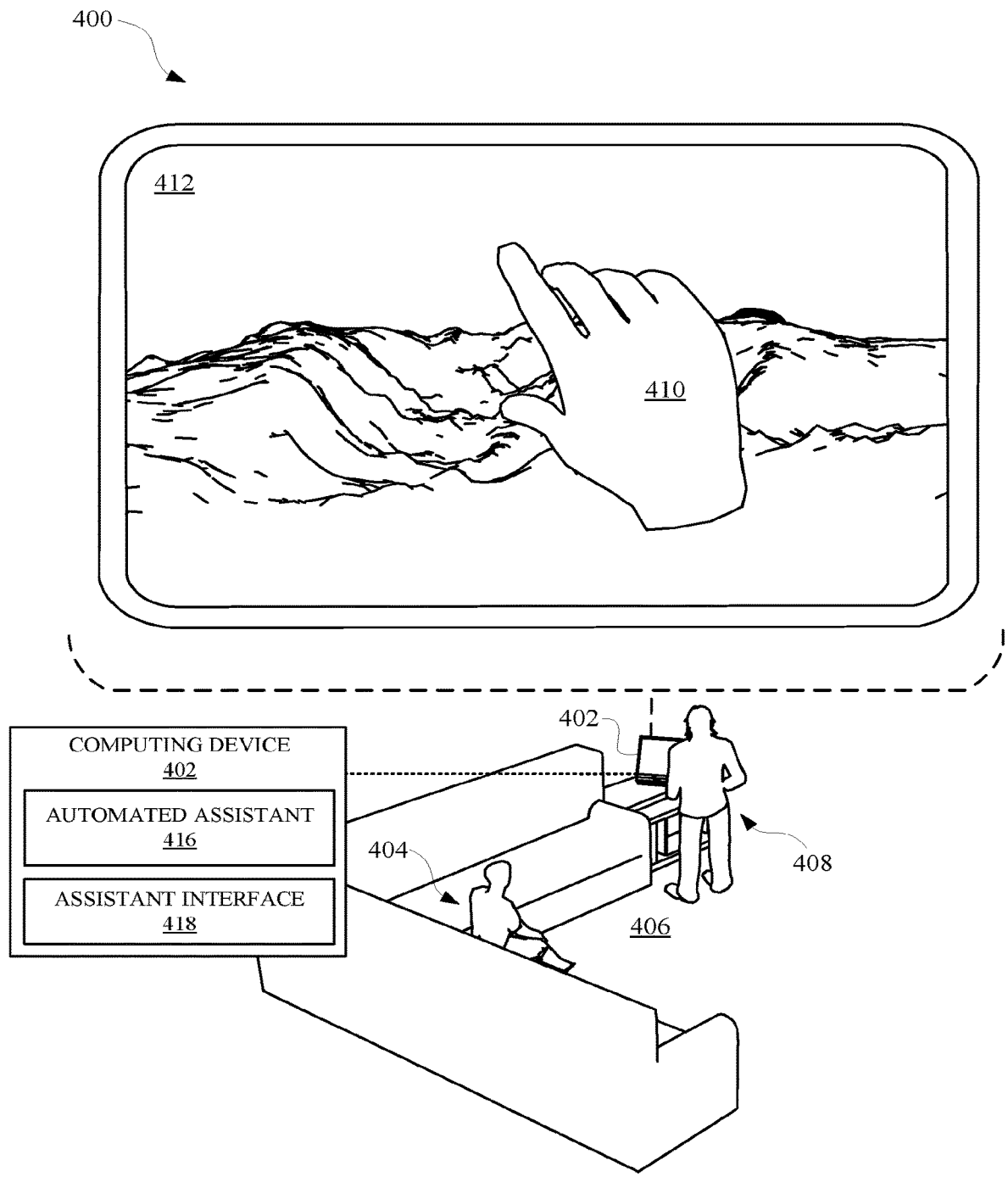
FIG. 4A, FIG. 4B, and FIG. 4C illustrate views of a user interacting with an automated assistant that provides categorical suggestions for controlling various devices and/or applications via a graphical user interface.
Figure 4B:
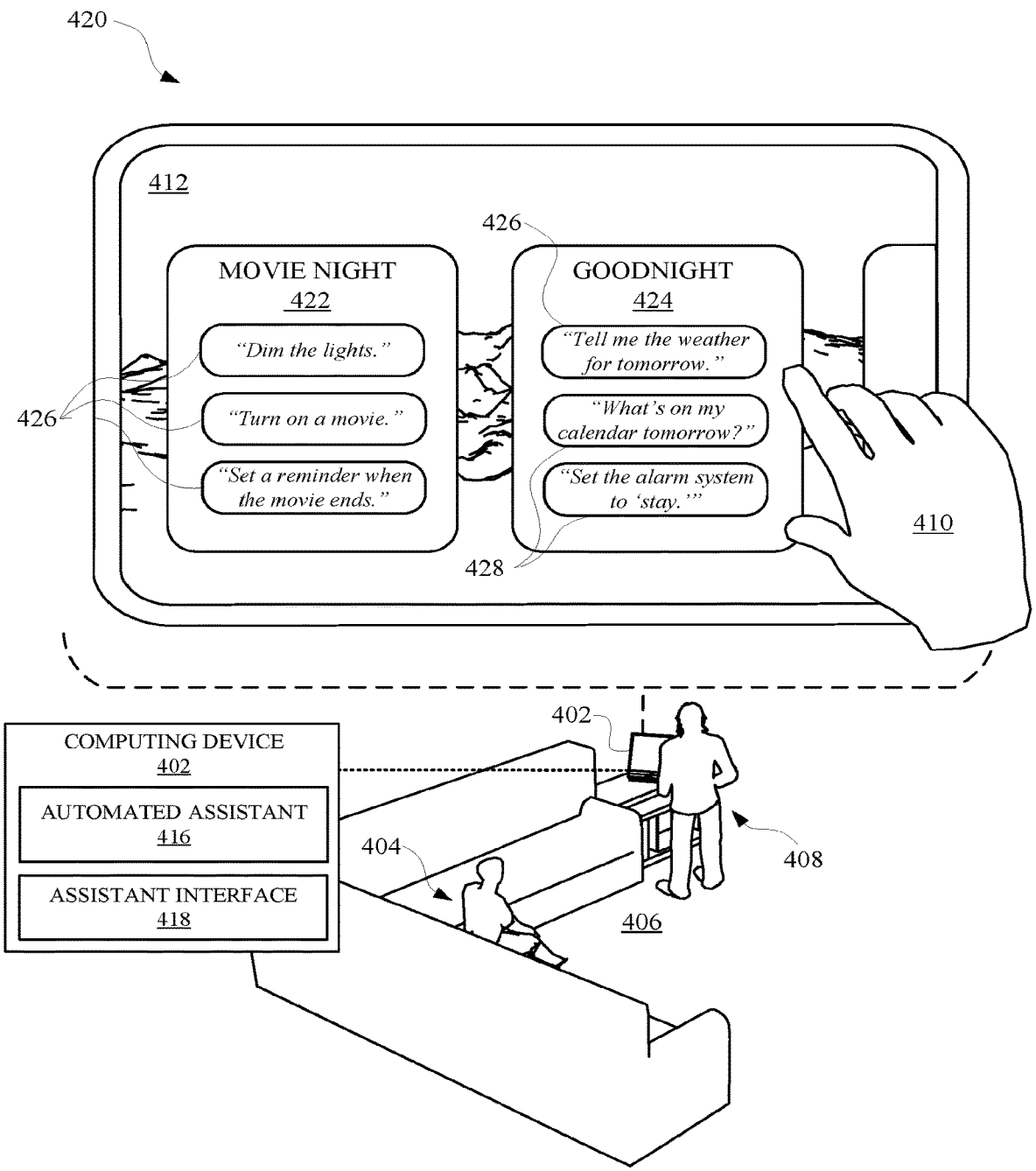

FIG. 4A illustrates a view 400 of a user 408 interacting with an automated assistant 416 that provides categorical suggestions for controlling various devices and/or applications via a graphical user interface 412. In some implementations, the automated assistant 416 be available via a computing device 40, which can access data characterizing a context of the user 408 in order to identify one or more action categories to suggest to the user 408. Each action category can correspond to one or more suggested actions that can be initialized via the automated assistant 416. For example, when the user 408 is interacting with the computing device 402 that is located in a living room 406, and the time that the user 408 is interacting with the computing device 402 is a Thursday night, the automated assistant 416 can generate a movie night category 422 and a goodnight category 424, as provided in view 420 of FIG. 4B. These categories can be based on previous interactions between the automated assistant 416 and the user 408 during one or more previous Thursday nights when the user 408 was located in the living room 406. Assistant data corresponding to the previous interactions can identify one or more actions that the user 408 can initialize via the automated assistant 416 during the previous interactions. Such actions can include adjusting settings of lights, turning on a movie at the computing device 402, and/or setting a reminder when a movie has completed. Based on the assistant data and/or other data, the automated assistant 416 can cause the graphical user interface 412 to render a first set of selection elements 426 for the movie night category 422, and a second set of selection elements 428 for the good night category 424. Each category can be assigned one or more actions based on a variety of different data. For instance, in some implementations, the automated assistant 416 can identify one or more third-party computing devices that are connected to a local network to which the computing device 402 is also connected, and determine one or more third-party actions that are capable of being performed by the one or more third-party computing devices. These third-party actions can be identified when considering actions to assign to a category and/or actions to suggest to the user 408 via the graphical user interface 412.

In some implementations, the selectable elements provided for each rendered category can be adapted based on feedback from the user 408 and/or any other data that is accessible to the computing device 402. For example, contextual data that provides a basis for rendering the categorical suggestions can characterize one or more devices that are associated with an account of the user 408, one or more devices that are most proximate to the user 408 when they categorical suggestions are being rendered, types of devices that the user 408 is accessing or is predicted to access in the future, one or more other accounts associated with the user 408, one or more commands or requests previously provided by the user 408, and/or any other information that can be useful for rendering a suggestion for the user 408. As such information changes over time, such as a location of the user relative to one or more devices, categories and/or categorical suggestions can be modified accordingly.

In some implementations, each category for action suggestions can be ranked based on the assistant data, contextual data, and/or any other data, and each rank can be compared to ranks for other categories in order to identify most suitable categories to render at the graphical user interface 412. In some implementations, rankings and/or an order of categorical suggestions can be generated using one or more trained machine learning models. Alternatively, or additionally, rankings and/or an order of categorical on suggestions can be generated based on the assistant data, contextual data, and/or any other information that can be useful for rendering a suggestion for any user. In some implementations, one or more highest-ranking and/or most prioritized categorical suggestions can be rendered for the user 408 in response to the user 408 interacting with the automated assistant 416, the computing device 402, an assistant interface 418, and/or otherwise providing an indication that the user 408 would be interested in seeing the categorical suggestions.

Between instances when the automated assistant 416 presents the highest ranking categorical suggestions, such rankings can be adjusted according to feedback from one or more users. For example, when a first categorical suggestion and a second categorical suggestion are provided at the user interface 412, and the user 408 selects a suggestion element from only one of the categorical suggestions, a ranking of the categorical suggestion corresponding to the selected suggestion element can be adjusted to reflect the selection by the user 408. Alternatively, or additionally, when the user 408 selects a suggestion element, a ranking of a different categorical suggestion corresponding to one more suggestion elements not selected by the user 408, can be adjusted to reflect the lack of selection of that categorical suggestion by the user 408.

In some implementations, suggestion elements rendered with each categorical suggestion can also be ranked according to one or more sources of data and/or one or more sources of feedback. For example, when a particular categorical suggestion is rendered at the graphical user interface 412, and multiple different suggestion elements are also rendered with the particular categorical suggestion, each suggestion element can be assigned a corresponding rank. Should the user select two out of three of the suggestion elements in order to initialize two particular actions, ranks assigned to the two suggestion elements can be modified according to the selection by the user 408. Alternatively, or additionally, should the user select two out of three suggestion elements in order to initialize two particular actions, a rank assigned to the unselected suggestion element can be modified according to the lack of selection by the user 408. In this way, categorical suggestion will be adapted over time according to preferences of the user 408.

In some implementations, a rendered categorical suggestion, such as the goodnight categorical suggestion 424, can operate as an interface for initializing the suggestion elements that are rendered with the rendered categorical suggestion. For example, when the goodnight categorical suggestion 424 is rendered at the graphical user interface 412 with the suggestion elements 426, the user 408 can use their hand 410 in order to provide an input for selecting the entire good night categorical suggestion 424. The input can be, for example, a long tap, double tap, slide tap, and/or any other gesture that can be performed by the user 408 to indicate a selection. In response to the user 408 providing the input, such as a long tap, for selecting the entire goodnight categorical suggestion 424, the automated assistant 416 can initialize performance of each action associated with each suggestion element 426. For example, in response to the input for selecting the entire goodnight categorical suggestion 424, the automated assistant 416 can provide a weather report, summarize calendar entries, and secure an alarm system, at least based on each action that corresponds to a suggestion element 426 rendered at the goodnight categorical suggestion 424 (e.g., "Tell me the weather for tomorrow?", "What's on my calendar tomorrow?", and "Set the alarm system to 'stay.'").

In some implementations, new categories can be generated and suggested to a user in order to reduce a number of inputs to process at a computing device, and further familiarize the user with various functionality. For example, when the user 408 enters their kitchen 440 on another day, but at a similar time that the user 408 previously selected the goodnight categorical suggestion 424, another computing device 442 within the kitchen 440 can also render the goodnight categorical suggestion 424. This rendering can be based on the user 408 having previously selected the goodnight categorical suggestion 424 one or more times on separate occasions and/or under similar circumstances. Furthermore, the automated assistant 416 can analyze a current circumstance of the user 408 in order to suggest a new categorical suggestion 432 to render for the user 408.

As an example, the user 408 can have a history of accessing recipe websites (e.g., a baking website) from their other computing device 442 while in their kitchen. Additionally, the kitchen 440 can have multiple different IoT devices connected to a local area network with the other computing device 442. For instance, a connected device 438, such as a smart oven, can be located in the kitchen with another assistant-enabled device 446. The automated assistant 416 can identify one or more recent actions executed by the connected device 438 and the assistant-enabled device 446 in order to suggest to the user 408 based on similarities between a current circumstance and previous circumstance (s) in which the user 408 previously caused the one or more recent actions to be performed. A relevance of each recent action to the current circumstance can be scored in order to determine a ranking for the actions to suggest to the user 408 via the new categorical suggestion 432. In some implementations, a ranking for an action can be based on a similarity between the current circumstance and a previous circumstance in which the user 408 requested that the action be performed.

Figure 4C:
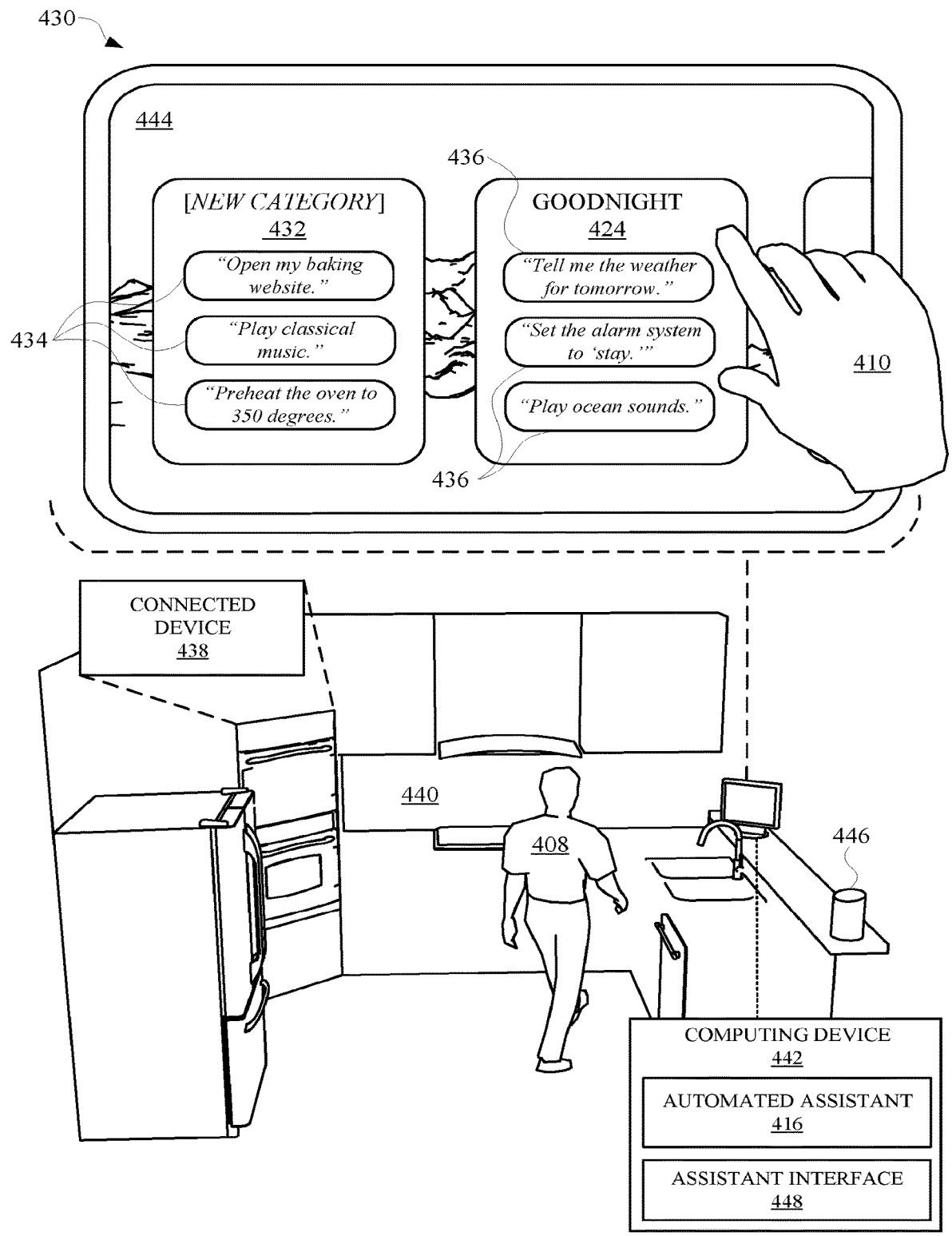

For instance, during a previous circumstance in which the user 408 caused an alarm system to operate in a "mode," the user 408 may have also caused the assistant-enabled device 446 to play classical music. Therefore, should the user 408 cause the alarm system to enter the "stay" mode or otherwise be recommended the selectable suggestion element 436 corresponding to securing the alarm system, as provided in view 430 of FIG. 4C, the automated assistant 416 can also rank a "play classical music" action over other actions to be considered for the new categorical suggestion 432. Additionally, or alternatively, the automated assistant 416 can determine that a third party connected device 438 is located in the kitchen 440, and can identify one or more most common functions employed by the user 408 via the connected device 438 under circumstances similar to the current circumstance. For instance, the automated assistant 416 can determine that the most common action performed by the connected device 438 when the assistant-enabled device 446 is playing music in the kitchen 440 is "preheating" to 350 degrees. Therefore, an action of "preheating" can be assigned a score that prioritizes the pre-heating action over other actions being ranks for the new categorical suggestion 432.

When the ranking of actions for the new categorical suggestion 432 has been completed, a list of N (where "N" is any number) of selectable suggestion elements 434 can be rendered in a graphical control element corresponding to the new categorical suggestion 432. The new categorical suggestion 432 can be rendered at a graphical user interface 444 of the computing device 442, and the user 408 can provide one or more gestures in order to initialize performance of one or more actions assigned to the new categorical suggestion 432.

Additionally, or alternatively, the categorical suggestion 432 can be assigned a name by the user 408 by performing a gesture at an assistant interface 448 of the computing device 442, thereby further allowing the categorical suggestion 432 to be customized.

Figure 5A:
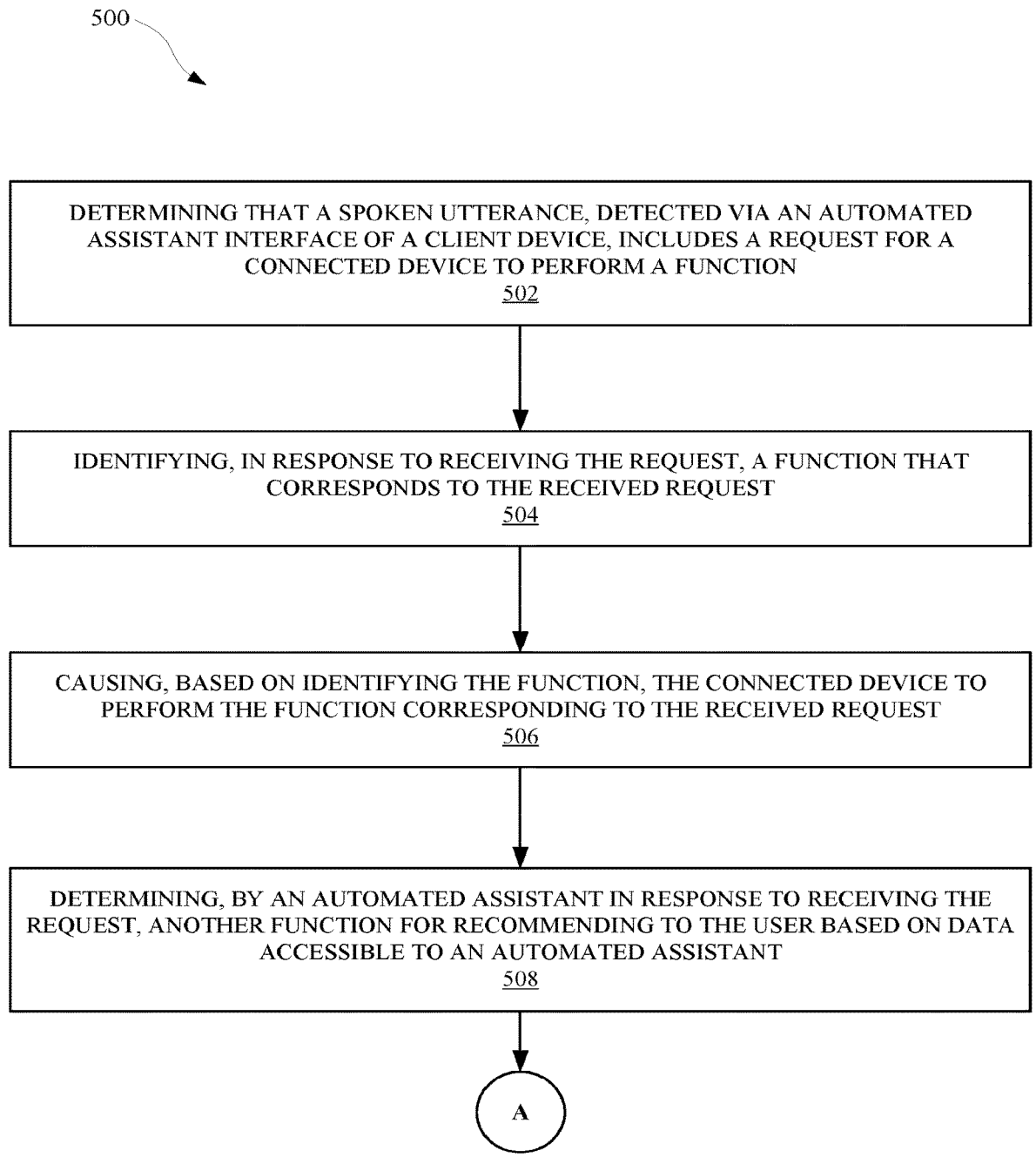
FIG. 5A and FIG. 5B illustrate methods for providing a composite graphical assistant interface that includes suggestions for functions capable of being performed by multiple different connected devices.
Figure 5B:
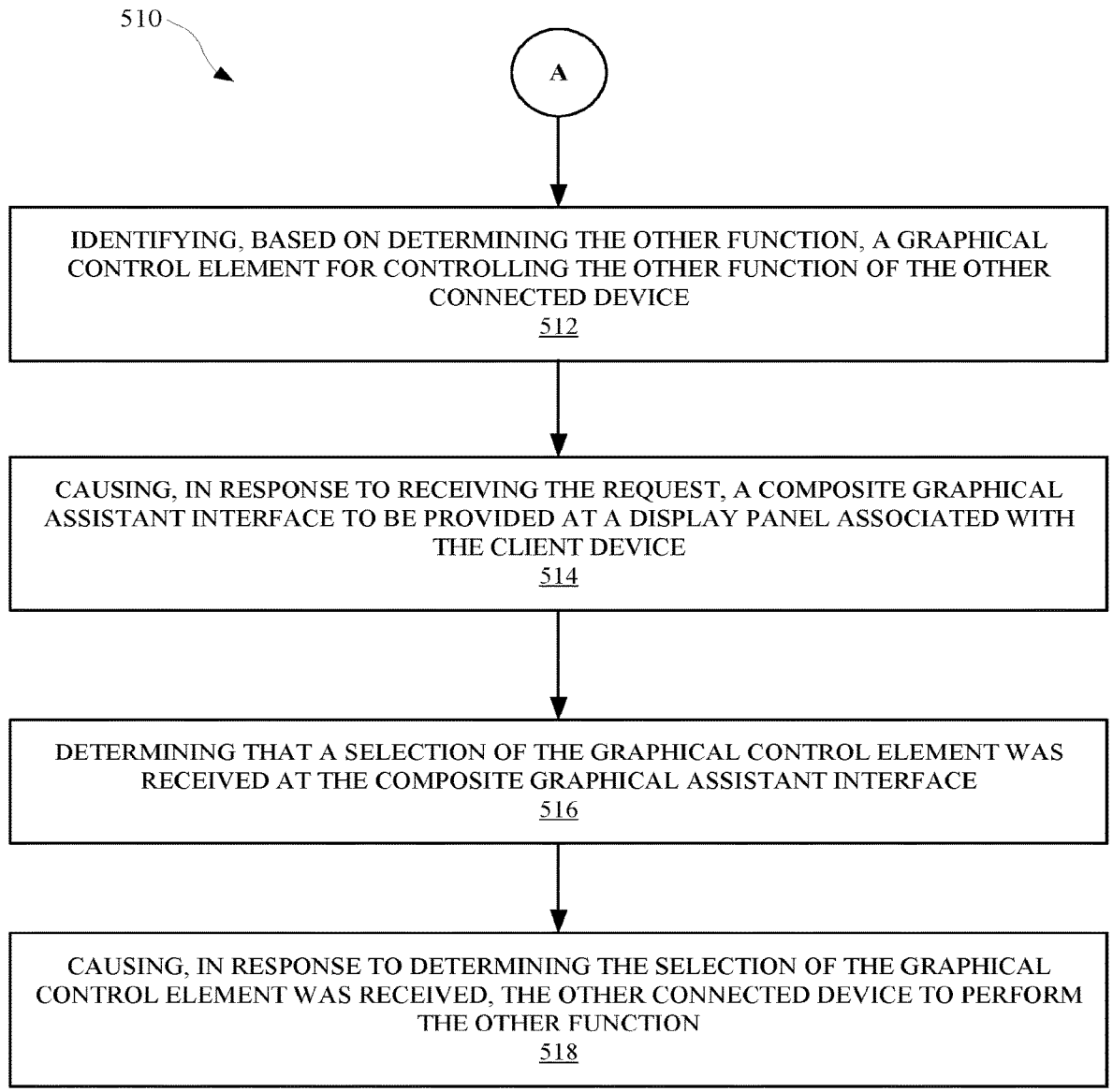

FIGS. 5A and 5B illustrate methods 500 and 510 for providing a composite graphical assistant interface that includes suggestions for functions capable of being performed by multiple different connected devices. The method 510 can be a continuation of method 500 as indicated by the continuation element "A," encircled at FIG. 5A and FIG. 5B. The method 500 and 510 can be performed by one or more computing devices, applications, and/or any other apparatus or module capable of interacting with a connected device or automated assistant. The method 500 can include an operation 502 of determining that a spoken utterance, detected via an automated assistant interface of a client device, includes a request for a connected device to perform function. The automated assistant interface can be one or more of a microphone, touch display panel, camera, sensor, and/or any other apparatus through which a user can provide input to a device.

The client device can be a computing device that can include a touch display panel that is integral to the computing device, or is otherwise in communication with the computing device. For instance, the client device can be an assistant device that is connected to a WiFi network, and the assistant device can be in communication with a separate display panel (e.g., a television or other display device) via the WiFi network. Any device with which the client device is in communications can be a connected device. For instance, any IoT device, in a home that includes a WiFi network with which a client device is connected, can be considered a connected device. Alternatively, or additionally, any device that the client device is in communications with over a local area network, a wide area network, and/or the internet can be a connected device. An automated assistant can communicate with a connected device by receiving commands from a user via an automated assistant interface and causing a client device to interact with the connected device. Alternatively, or additionally, in response to the automated assistant receiving a command, the automated assistant can cause a remote server to issue a command to the connected device. Alternatively, or additionally, the automated assistant can cause a remote server to issue a command to a connected device server that is associated with the connected device, in order that the connected device server will cause the connected device to perform a particular function.

The method 500 can further include an operation 504 of identifying, in response to receiving the request, a function that corresponds to the received request. The function can be identified by accessing a storage or list of available functions capable of being performed by one or more connected devices that in communication with the client device. In some implementations, a remote server device that at least partially hosts the automated assistant can query a separate connected device server, which can provide data that identifies one or more functions capable of being performed by the connected device. When the connected device is an IoT device, the function can be any executable operation capable of being performed by the connected device such as, but not limited to, providing information from a sensor, changing an input parameter for a hardware component of the connected device, causing the connected device to perform a network operation, causing the connected device to communicate another connected device, and/or any other function capable of being performed by a device. For example, the function, when executed by the connected device, can cause the connected device to turn off any lights controllable by the connected device (e.g., "function(connected_device: lights: {off})", where "off" is a slot value of a parameter "lights").

The method 500 can also include an operation 506 of causing, based on identifying the functions, the connected device to perform the function corresponding to the received request. The client device or automated assistant can cause the connected device to perform the function by transmitting command data to the connected device, or causing the command data to be transmitted to the connected device. As a result of the connected device performing the function, a status of the connected device can be modified in order to reflect any change effectuated by execution of the connected device. The status of the connected device can be characterized by data such as, "connected_device: status(lights [off], brightness[null], hue[null])," where particular parameters or slot values can be empty or null as a result of particular slot values (e.g., "off") provided to the connected device. In some implementations, depending on a context in which the function was executed by the connected device, a profile associated with a user, or the context, can be updated or otherwise modified to reflect the request for the function to be performed. In this way, data corresponding to historical interactions between the user and the connected device and/or the automated assistant can be subsequently processed in order to enhance future interactions between the user and the connected device and/or the automated assistant. For instance, when the function corresponds to a request to turn off the lights of a device at night, the profile can be updated to rank the particular function higher at night, and/or otherwise indicate a historical inclination of the user to request the function be executed at night. Thereafter, the profile can be used as a basis from which to provide recommendations for functions to be executed by various different connected devices, at least according to a historical inclination of the user to request those, or similar, functions within a particular context. In some implementations, the profile can indicate functions that should be suggested according to a status of one or more connected devices. In this way, the automated assistant can check one or more statuses of one or more connected devices, and determine a historical inclination of the user to request particular functions based on the one or more statuses of the one or more connected devices.

The method 500 can further include an operation 508 of determining, by an automated assistant in response to receiving the request, another function for recommending to the user based on data accessible to an automated assistant. The other function can be different than the function performed at operation 506 and can be performed by a different connected device than the connected device that performed the function at operation 506. The other function can be determined based on data that is accessible to the automated assistant and indicates a historical inclination of the user to cause the other function to be performed, or interact with the other connected device, in the current context. For instance, the other function can be determined based on a current status of the connected device that performed the function at operation 506. Therefore, when the current status of the connected device is "connected_device: status(lights[off], brightness[null], hue[null])," the suggested other function can be to turn on a security alarm of a security system (e.g., the other connected device), at least based on a previous interaction when the user turned off their lights—causing the status of the lights to change—and turned on their security system. By providing such a suggestion, the computational resources and network resources can be preserved, compared to the user issuing voice commands to cause such functions to be performed, thereby resulting in speech processing.

The method 500 can proceed to method 510, as indicated by continuation element "A," encircled in FIG. 5A and FIG. 5B. The method 510 can include an operation 512 of identifying, based on determining the other function, a graphical control element for controlling the other function of the other connected device. The graphical control element can be selected from multiple graphical control elements that are stored in a memory that is accessible to the client device and/or the automated assistant. In some implementations, each graphical control element can be stored in association with metadata that indicates inputs capable of being characterized by the graphical control element and/or outputs capable of being provided in response to a selection or gesture received by the graphical control element. For instance, a graphical control element representing a two-way switch can be stored in association with metadata that indicates the graphical control element can receive a touch input and/or a swipe gesture, and/or the graphical control element can provide a binary output such as 1 or 0, and/or on or off. The memory can store a variety of different graphical control element, each capable of providing two or more different outputs, and/or receiving a variety of different inputs.

The method 510 can also include an operation 514 of causing, in response to receiving the request, a composite graphical assistant interface to be provided at a display device associated with the client device. The composite graphical assistant interface can be a graphical user interface with one or more selectable elements capable of causing a particular function to be performed at a connected device when a selection and/or gesture is received at the composite graphical assistant interface. The composite graphical assistant interface can act as a modality through which a user can interact with the automated assistant and/or multiple different connected devices, despite the connected devices being associated with other different third party applications for controlling them. In this way, a user does not necessarily have to download and/or access multiple different applications to control their respective IoT devices but, rather, can simply cause a composite graphical assistant interface to be provided at a display panel. Furthermore, the composite graphical assistant interface can be adapted by the automated assistant according to one or more statuses of one or more respective connected devices, and/or a context in which the user is interacting with the automated assistant and/or a client device. In some implementations, a composite graphical assistant interface can be associated with data that includes slot values for particular graphical control elements presented at the composite graphical assistant interface. The slot values can be provided to corresponding functions, which can then be performed by connected devices that correspond to any respective graphical control elements.

The method 510 can further include an operation 516 of determining that a selection of the graphical control element was received at the composite graphical assistant interface. The selection of the graphical control element can be determined based on data that is transmitted by a display panel, which provides the composite graphical assistant interface, in response to a user touching or otherwise providing a gesture at the display panel. Any slot value corresponding to the determined selection of the graphical control element can then be provided to a device that is responsible for further causing the function to be performed at a respective connected device, such as the connected device itself or a connected device server.

The method 510 can also include an operation 518 of causing, in response to determining the selection of the graphical control element was received, the other connected device to perform the other function. The other function can be, for example, turning on a security system of a home of the user. The other function can be suggested to the user, at least based on a historical inclination of the user to manually turn off their lights and turn on their security system. The other function can also be suggested based on a current status of the lights (e.g., the lights being off). Alternatively, or additionally, the other function can be suggested based on the automated assistant determining that the current status of the lights has been requested to change to "off" and/or that a current context in which the request was made corresponds to a time of day, a geographic location for the user, a status of one or more other devices, and/or any other information that can be used to cause a computer function to be performed. In response to the other function being performed, a current status can be updated at a table or other data storage that includes identifiers for statuses of various connected devices. In this way, the automated assistant can generate additional from an updated combination of statuses and as the statuses change over time. For instance, now that the security alarm is on and the lights are off, the automated assistant can determine a graphical control element for controlling a function of a communications device, in order to allow the user to place the communications device in a silent mode by interacting with the graphical control element at a new composite graphical assistant interface.

Figure 6:
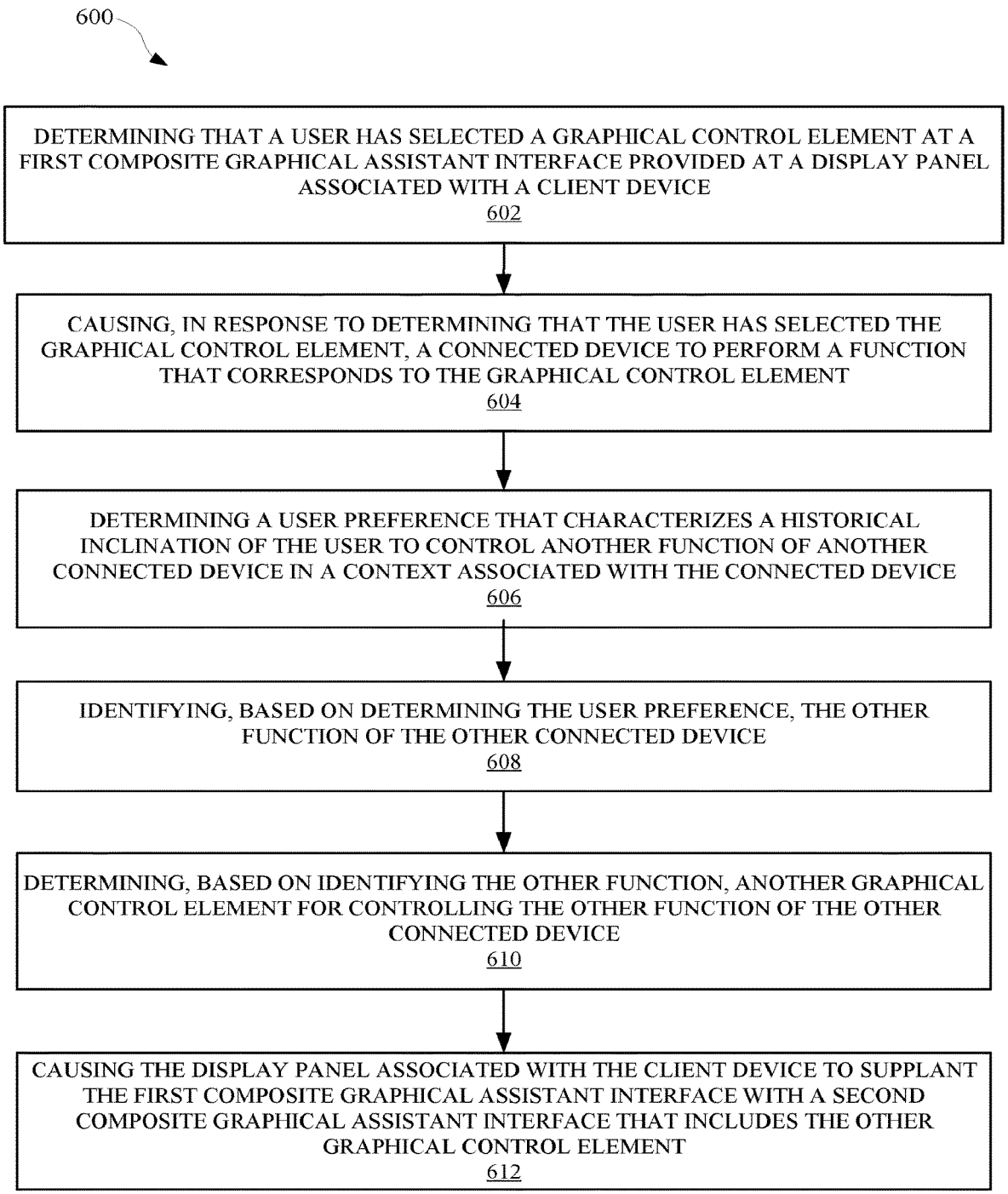
FIG. 6 illustrates a method for supplanting a composite graphical assistant interface with graphical control elements for controlling a connected device.

FIG. 6 illustrates a method 600 for supplanting a composite graphical assistant interface with graphical control elements for controlling a connected device. The method 600 can be performed by one or more computing devices, applications, and/or any other apparatus or module capable of interacting with a connected device and/or an automated assistant. The method 600 can include an operation 602 of determining that a user has selected a graphical control element at a first composite graphical assistant interface provided at a display panel associated with a client device. The display panel can be connected to the client device as an integral portion of the client device, or as a device that is in communication with the client device over a network. The first composite graphical assistant interface can be presented at the display panel in order to provide the user with a modality through which the user can control a variety of different connected devices, despite the connected devices being manufactured from the same or different entities. Therefore, the first composite graphical assistant interface can include multiple different graphical control elements through which the user can control various different connected devices.

The method 600 can also include an operation 604 of causing, in response to determining that the user has selected the graphical control element, a connected device to perform a function that corresponds to the selected graphical control element. The connected device can be caused to perform the function via the client device and/or the automated assistant. For instance, in response to the first composite graphical assistant interface receiving the selection of the graphical control element, the client device and/or the automated assistant can transmit data to the connected device to cause the connected device to perform the function. Alternatively, or additionally, the client device can communicate data to a remote server, and the remote server can communicate with the connected device to cause the connected device to perform the function.

The method 600 can further include an operation 606 of determining a user preference that characterizes a historical inclination of the user to control another function of another connected device in a context associated with the connected device. The user preference can be data that indicates an inclination or preference of the user to control particular functions of one or more connected devices within a particular context. For instance, the context can correspond to a status or statuses of one or more respective devices, a time of day, gesture or gaze of a user, a scheduled event, a correspondence to a previous interaction between the user and an automated assistant, and/or any other data that can be used as a basis from which to suggest functions for a user to control. In some implementations, the user preference or other data can rank functions according to their popularity or frequency that a particular user controls the functions within a particular context. In order to provide the rankings for functions, a learning model can be employed to receive inputs related to the functions performed, and output data corresponding to rankings for functions that should be suggested to the user. The learning model can be trained based on data that characterizes an interaction between the automated assistant and the user, and/or the user and one or more connected devices.

The method 600 can also include an operation 608 of identifying, based on determining the user preference, the other function of the other connected device. The user preference data can identify the other function, multiple different connected devices, one or more parameters and/or slot values corresponding to the other function, slot values that have been previously provided for the other function in particular contexts, and/or any other data that can be useful of executing a particular function.

The method 600 can also include an operation 610 of determining, based on identifying the other function, another graphical control element for controlling the other function of the other connected device. The other graphical control element can be selected from a memory that is accessible to the client device and/or the automated assistant, and can be associated with metadata that provides at least some correspondence to the other identified function. For instance, the function can be associated with a parameters can receive two or more different slot values, as opposed to a binary parameter, which can only take two. As a result, a graphical control element that would selected for controlling the graphical control element can be one that is capable of providing two or more different valued outputs, such as a dial or a scroll bar.

The method 600 can further include an operation 612 of causing the display panel associated with the client device to supplant the first composite graphical assistant interface with a second composite graphical assistant interface, which includes the other graphical control element. The second composite graphical assistant interface can replace the first composite graphical assistant interface in order to provide further suggestions for the user to control particular connected devices within a particular context. In some implementations, the first composite graphical assistant interface can correspond to a single connected device provided by a third party, and the second composite graphical assistant interface can correspond to multiple different connected devices provided by multiple different third parties. In this way, a user does not necessarily need to install and/or open a variety of different applications to control different connected devices, but, rather, can interact with a single composite graphical assistant interface in order to control a variety of different connected devices.

Figure 7A:
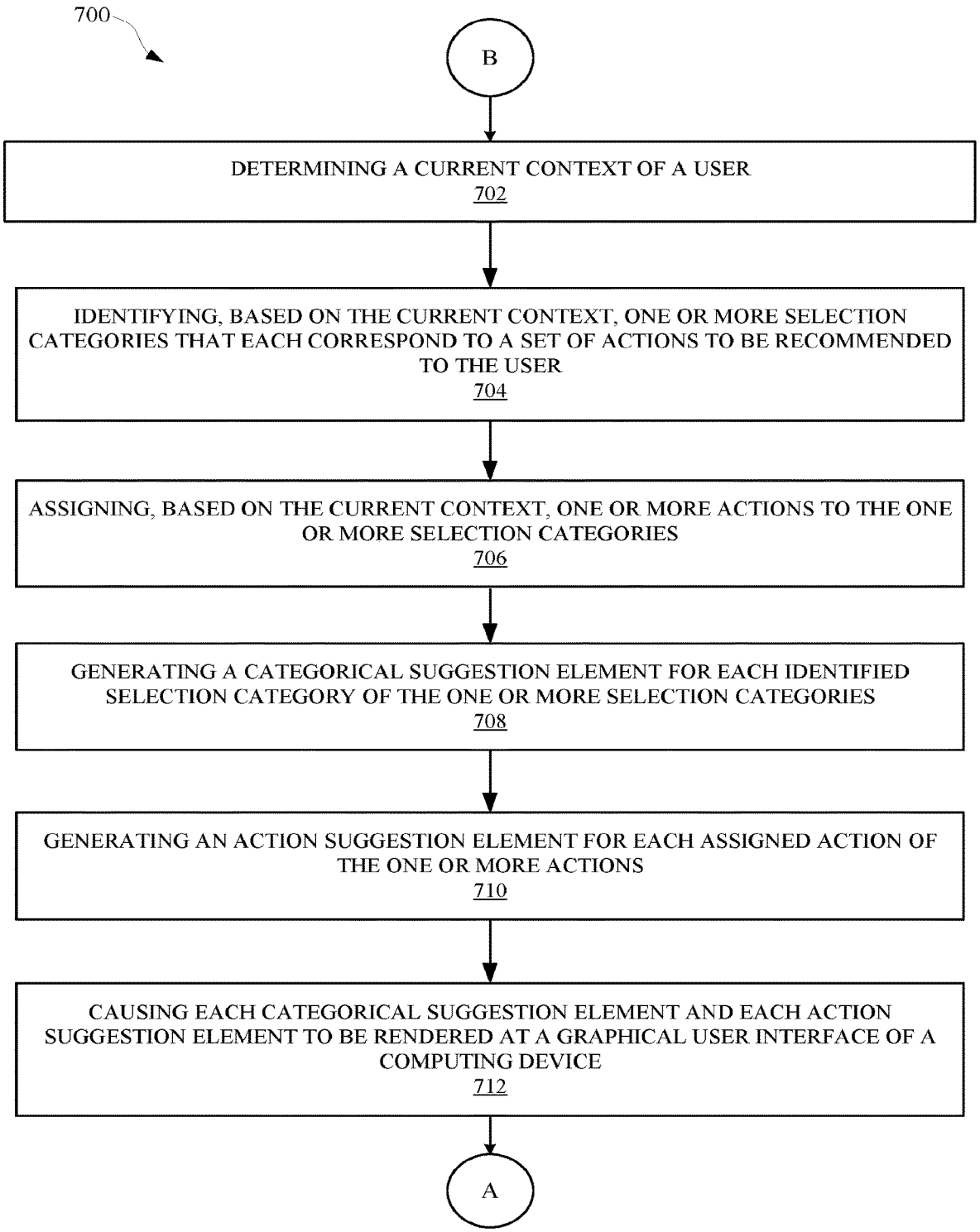
FIG. 7A and FIG. 7B illustrate methods for providing, at a graphical user interface, one or more selection categories with one or more corresponding action suggestions.
Figure 7B:
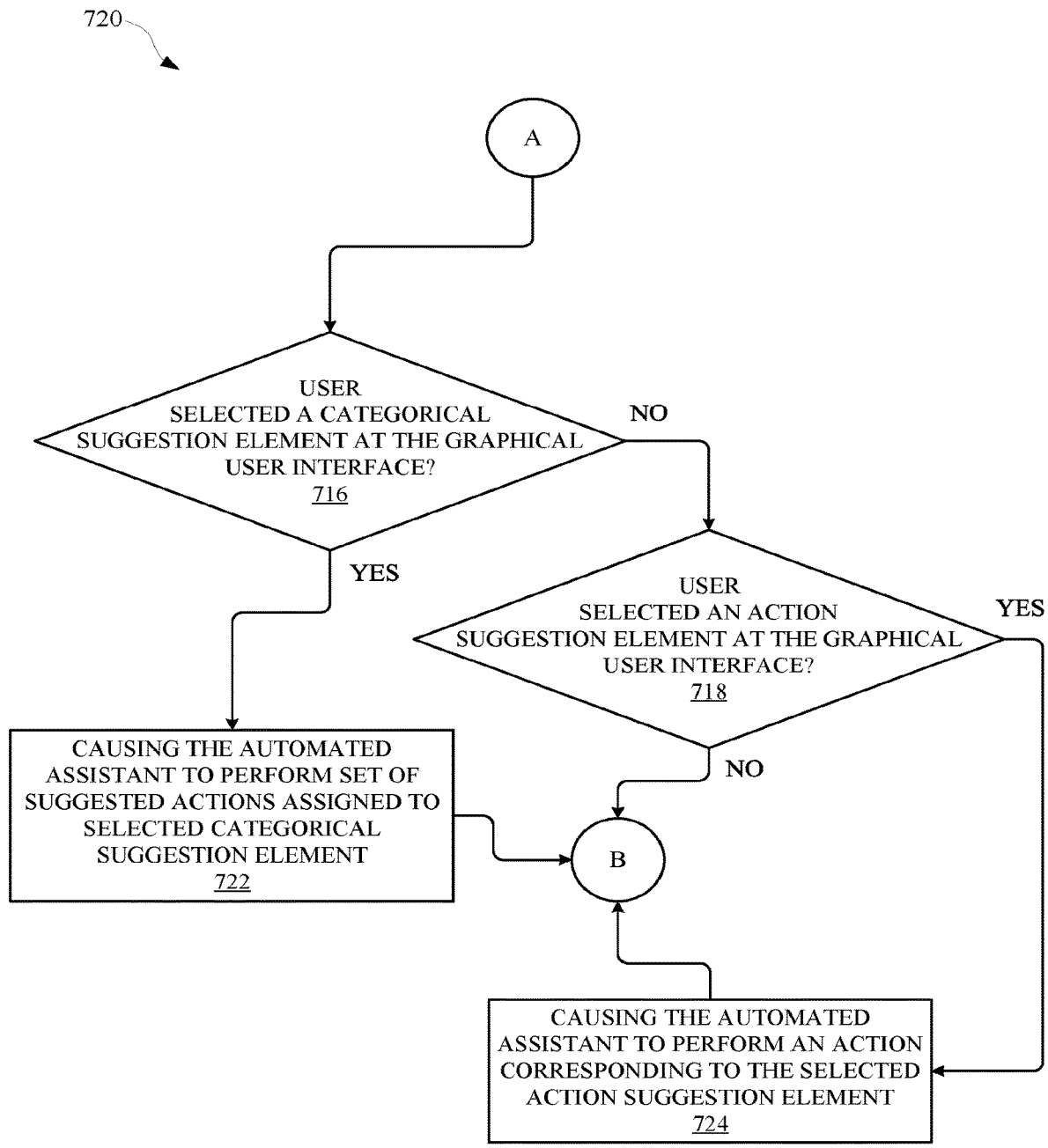

FIG. 7A and FIG. 7B illustrate a method 700 and a method 720, respectively, for providing, at a graphical user interface, one or more selection categories with one or more corresponding action suggestions. The action suggestions can be identified based on a correspondence between previous circumstances in which the user invoked an automated assistant to initialize one or more actions. The method 700 and the method 720 can be performed by one or more computing devices, applications, and/or any other apparatus or module capable of providing access to an automated assistant. The method 700 can include an operation 702 of determining a current context of a user. The current context can be characterized by contextual data that indicates various features of a context of the user and/or a computing device that the user is optionally interacting with. For example, the contextual data can characterize a time of day, a location of the user, one or more devices that are at the location of the user, one or more applications that are accessible to the user, a status of each device that is available to the user, one or more ongoing actions being performed by the devices and/or applications, calendar information associated with the user, messaging application available at one or more devices, and/or any other information that can detail a context of the user.

The method 700 can further include an operation 704 of identifying, based on the current context, one or more selection categories that each correspond to a set of actions to be recommended to the user. One or more actions of each set of actions may have been performed via the automated assistant at a prior time and at the direction of the user. Furthermore, each previously performed action can be associated with a particular selection category. The selection categories that are identified at the operation 704 can be identified based on a degree of similarity between the current context of the user and a prior circumstance in which the user previously directed the automated assistant to perform an action associated with a particular selection category. In some implementations, the selection categories can be ranked according to the degree of similarity, and a top N selection categories, where N is any number, can be selected for recommending to the user in the current context.

The method 700 can further include an operation 706 of assigning, based on the current context, one or more actions to the one or more selection categories. The one or more actions assigned to the one or more selection categories can be actions that have yet to be associated with a particular selection category. Rather, these actions can be actions that were previously performed by the automated assistant within a prior context. In order to assign a particular action to a particular selection category, the prior context can be compared to the prior circumstance that is associated with the particular selection category. For example, a first action may have been performed during a first context, and contextual data corresponding to the first context can be compared to circumstantial data for each selection category. The selection category with which the first contextual data most closely correlates can be assigned the first action. This process can be repeated for a second action, a third action, etc., until one or more selection categories have been assigned one or more additional actions to suggest.

The method 700 can further include an operation 708 of generating a categorical suggestion element for each identified selection category of the one or more selection categories. A categorical suggestion element can be a graphical user interface element that, when selected, causes a set of actions assigned to the categorical suggestion element to be performed. The method 700 can further include an operation 710 of generating an action suggestion element for each assigned action of the one or more actions. An action suggestion element can be another graphical user interface element that, when selected, causes the selected action to be initialized via the automated assistant.

The method 700 can further include an operation 712 of causing each categorical suggestion element and each action suggestion element to be rendered at a graphical user interface of a computing device. The computing device can be, for example, an assistant device that is within a home of the user and provides an interface through which the user can control the automated assistant, one or more third-party applications, and/or one or more third-party IoT devices. A third-party can be an entity that is different from an entity that provided the automated assistant and/or the computing device. In some implementations, the graphical user interface can be rendered in response to authentication of the user via facial recognition, voice recognition, touch ID recognition, and/or any other authentication process. Alternatively, or additionally, the graphical user interface can be rendered in response to a context of the user changing, an indication that the user would like a particular action to be performed, detecting the presence of a new device, detecting a change in status of a device or application, and/or any other change in operation(s) of an application and/or device that can trigger a change at the graphical user interface.

The method 700 can continue from the operation 712, via continuation element "A," to the method 720 at an operation 716. The operation 716 can include determining whether the user selected a categorical suggestion element at the graphical user interface. Selection of a categorical suggestion element can be performed by a gesture from the user such as a long tap, double tap, single tap, voice input, swipe, and/or any other gesture that can be provided as an input to a computing device. When a categorical suggestion element is determined to have been selected, the method 720 proceed from the operation 716 to the operation 722. The operation 722 can include causing the automated assistant to perform the set of suggested actions assigned to the selected categorical suggestion element. In this way, a set of actions previously identified and assigned to the suggestion category for the categorical suggestion element can be initialized via an input to the automated assistant. This can preserve computational resources that might otherwise be wasted on the processing multiple different inputs from the user to initialize each individual action of the set of actions.

When the user is determined to have not selected a categorical suggestion element, the method 720 can optionally proceed from the operation 716 to the operation 718. The operation 718 can include determining whether the user selected an action suggestion element at the graphical user interface. For example, the graphical user interface can include multiple different categorical suggestion elements, and each categorical suggestion element can include a graphical boundary that surrounds one or more assigned action suggestion elements. When the user taps on an action suggestion element for a particular categorical suggestion element, the action associated with the action suggestion element can be initialized via the automated assistant, in accordance with operation 724. However, when the user is determined to have not selected an action suggestion element, the method 720 can proceed to the operation 702 via a continuation element be provided at FIG. 7B and FIG. 7A.

In some implementations, in response to the user selecting a categorical suggestion element or an action suggestion element, a ranking associated with the categorical suggestion element or the action suggestion element can be prioritized or re-prioritized relative to other elements that were not selected. Alternatively, or additionally, when a user selects multiple individual actions at the graphical user interface, the automated assistant can generate and/or render a hybrid categorical suggestion element that includes the selected individual actions. This hybrid categorical suggestion element can then be rendered subsequently when a degree of similarity between a subsequent context and the current determined context satisfy a degree of similarity threshold. This can reduce a number of inputs to the computing device and therefore preserve computational resources—given that the user would spend less time attempting to manually configure their device according to their own preferences.

Figure 8:
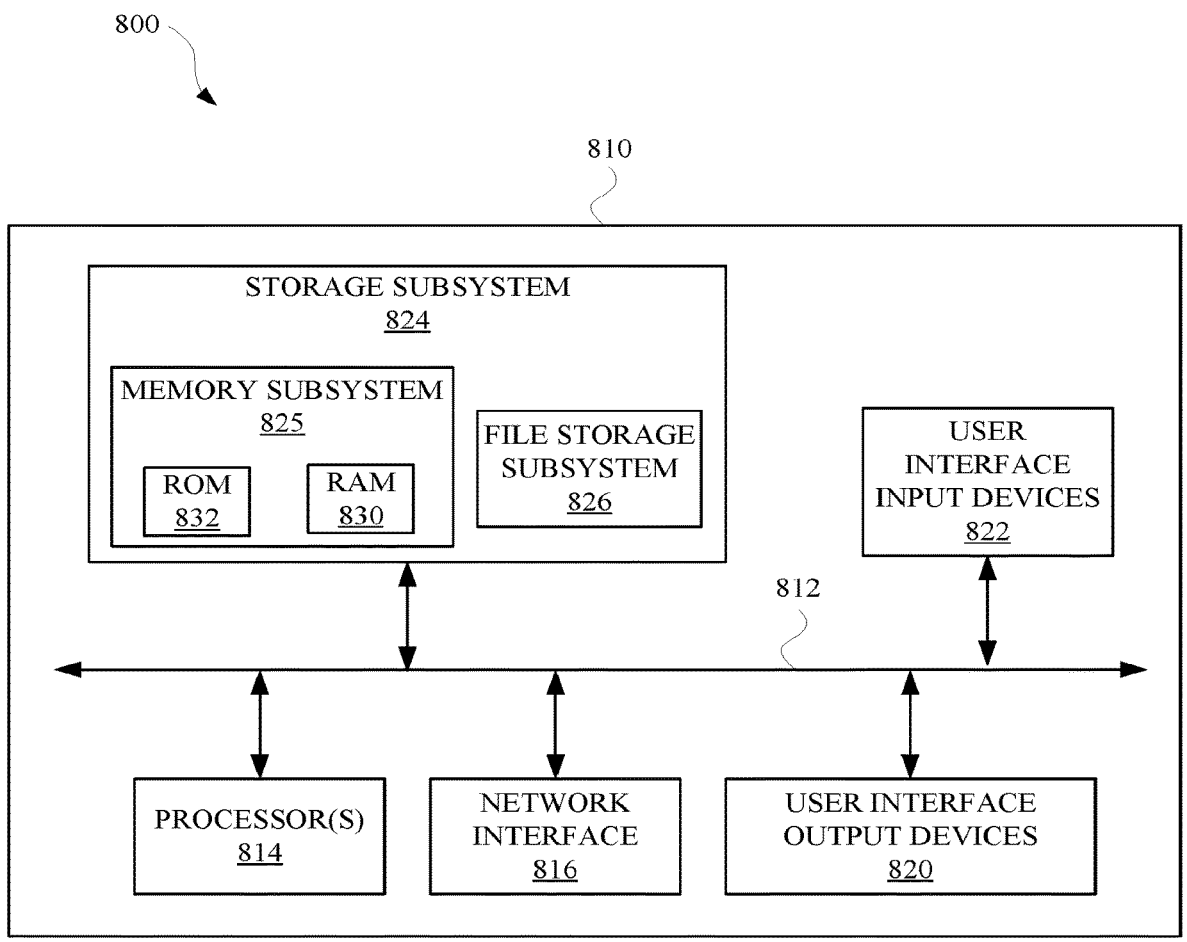
FIG. 8 is a block diagram of an example computer system.

FIG. 8 is a block diagram of an example computer system 810. Computer system 810 typically includes at least one processor 814 which communicates with a number of peripheral devices via bus subsystem 812. These peripheral devices may include a storage subsystem 824, including, for example, a memory 825 and a file storage subsystem 826, user interface output devices 820, user interface input devices 822, and a network interface subsystem 816. The input and output devices allow user interaction with computer system 810. Network interface subsystem 816 provides an interface to outside networks and is coupled to corresponding interface devices in other computer systems.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein. For example, the storage subsystem 824 may include the logic to perform selected aspects of method 500, method 510, method 600, method 700, method 720, and/or to implement one or more of connected device server 134, server device 112, automated assistant 118, client device 102, first connected device 132, second connected device 146, function identifying engine 142, composite interface engine 144, client device 204, client device 328, assistant device 326, computing device 402, automated assistant 418, and/or any other operation or apparatus discussed herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computer system 810 communicate with each other as intended. Although bus subsystem 812 is shown schematically as a single bus, alternative implementations of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating some implementations. Many other configurations of computer system 810 are possible having more or fewer components than the computer system depicted in FIG. 8.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a spoken utterance, detected via an automated assistant interface of a client device, includes a request for a connected device to perform a function. The connected device can be linked with the client device and the spoken utterance is provided by a user. The method can further include identifying, in response to receiving the request, a function that corresponds to the received request; causing, based on identifying the function, the connected device to perform the function corresponding to the received request; and determining, by an automated assistant in response to receiving the request, another function for recommending to the user based on data accessible to the automated assistant. The other function is different than the identified function and is capable of being performed by another connected device. The method can also include identifying, based on determining the other function, a graphical control element for controlling the other function of the other connected device; and causing, in response to receiving the request, a composite graphical assistant interface to be provided at a display panel associated with the client device, the composite graphical assistant interface comprising the identified graphical control element. The method can further include determining that a selection of the graphical control element was received at the composite graphical assistant interface; and causing, in response to determining the selection of the graphical control element was received, the other connected device to perform the other function.

In some implementations, the data identifies a current status of the other connected device and the current status is caused to change to a different status in response to the selection of the graphical control element. In some implementations, determining the other function includes: determining, based on the data, that a particular function at least partially effectuated the current status of the other connected device; and selecting the other function for recommending to the user, based at least in part on the particular function being different than the other function. In some implementations, determining the other function further includes: determining one or more slot values of functions that at least partially effectuated the current status of the other connected device; and identifying one or more parameters of one or more candidate functions capable of affected the current status of the connected device. Selecting the other function for recommending to the user, at least based on the particular function being different than the other function can include selecting the other function from the one or more candidate functions according to whether the other function includes a parameter that is different than another parameter of the particular function.

In some implementations, the method can include determining a speakable command that, when provided to the automated assistant interface, initializes the automated assistant to cause the other function of the other connected device to be performed. Causing the composite graphical assistant interface to be provided at the display panel can include causing the display panel to show the speakable command.

In some implementations, determining another function for recommending to the user based on data accessible to the automated assistant includes: identifying one or more additional connected devices, from a plurality of connected devices, based on a stored device topology that indicates a relationship of the one or more additional connected devices to the client device or the connected device; and identifying one or more additional functions capable of being performed by the one or more additional connected devices. The other function can be determined from the identified one or more additional functions. In some implementations, the data can indicate a status of the one or more additional connected devices that is based on a previous performance or nonperformance of the other function, and a configuration of the graphical control element at the composite graphical assistant interface can be based on the indicated status of the one or more additional connected devices.

In other implementations, a method implemented by one or more processors, is set forth as including operations such as determining that a spoken utterance, detected via an automated assistant interface of a client device, includes a request for an automated assistant to perform a function, wherein the spoken utterance is provided by a user. The method can also include identifying, in response to determining the request was provided by the user, a function that corresponds to the request provided by the user; and causing, based on identifying the function, the automated assistant to perform the function that corresponds to the request provided by the user. The method can further include determining a first current status of a first connected device that is linked to the client device. The first current status of the connected device can be affected by performance or nonperformance of a first function. The method can also include determining a second current status of a second connected device that is linked to the client device. The second current status of the second connected device can be affected by performance or nonperformance of a second function. The method can further include determining a first graphical control element for controlling the first function of the first connected device and a second graphical control element for controlling the second function of the second connected device; and determining, based on the first current status of the first connected device and the second current status of the second connected device, a configuration for each graphical control element of the first graphical control element and the second graphical control element. The method can also include causing, in response to determining the request was received, a display panel associated with the client device to provide a composite graphical assistant interface for controlling the first connected device and the second connected device. The composite graphical assistant interface can include the first graphical control element and the second graphical control element, which are arranged according to the determined configuration for each graphical control element.

In some implementations, the method can include accessing a profile for the user based on a voice characteristic associated with the spoken utterance. Identifying at least one function of the first function and the second function can be based on information available from the profile. In some implementations, the profile can indicate a historical inclination of the user to interact with at least one connected device of the first connected device and the second connected device within a particular context. In some implementations, the particular context can correspond one or more of a status of the first connected device or the second connected device, a geographic location of the user, a time, an event, or a presence of one or more other users.

In some implementations, determining a first current status of the first connected device can include requesting, from a remote server device, the first current status and command data associated with the first function. The first function can be different than the function performed by the automated assistant. In some implementations, the method can include receiving a selection of the first graphical control element for controlling the first function; and causing the client device to interact with the first connected device according to the command data associated with the first function.

In yet other implementations, a method implemented by one or more processors is set forth as including operations such as determining that a user has provided a request for an automated assistant to perform a function. The request can be received at an automated assistant interface of a client device. The method can further include causing, in response to determining that the user has provided the request, the automated assistant to perform the function that corresponds to the request; and determining, in response to determining that the user has provided the request, a user preference that characterizes a historical inclination of the user to control another function of a connected device in a context associated with the function performed by the automated assistant. The connected device can be linked to the client device. In some implementations, the method can include identifying, based on determining the user preference, the connected device and the other function of the connected device; and determining, based on identifying the connected device, a current status of the connected device. The current status can be affected by performance or nonperformance of the other function. The method can also include determining, based on identifying the other function and the current status of the connected device, a graphical control element for controlling the other function of the connected device. The graphical control element can indicate a capability of the graphical control element to cause the other function to be performed by the connected device resulting in the current status of the connected device changing to a different status. The method can further include causing, in response to determining the user has provided the request, a display panel associated with the client device to provide a composite graphical assistant interface that includes the graphical control element.

In some implementations, the method can include determining, based on the user preference, a selectable suggestion element associated with a separate connected device of the connected devices. Causing the display panel to provide the composite graphical assistant interface can include causing the composite graphical assistant interface to include the selectable suggestion element. In some implementations, the method can include determining that a selection of the selectable suggestion element was received at the composite graphical assistant interface; and causing one or more graphical control elements to be presented at the display panel for controlling one or more functions of the separate connected device. In some implementations, the method can include determining a speakable command that, when received at the automated assistant interface of the client device, invokes the automated assistant to cause the separate connected device to perform the one or more functions of the separate connected device. Causing the display panel associated with the client device to provide the composite graphical assistant interface can include causing the composite graphical assistant interface to include a natural language representation of the speakable command.

In some implementations, the method can include determining, in response to causing the connected device to perform the function, a resulting status of the connected device. The resulting status can be affected by performance of the function. Furthermore, causing the display panel associated with the client device to provide the composite graphical assistant interface can include causing the composite graphical assistant interface to include a graphical interface element that indicates the resulting status of the connected device.

In some implementations, the user preference characterizes the historical inclination of the user to control the other function based at least on a previous interaction between the user and the automated assistant. In some implementations, the previous interaction corresponds to a dialog session between the user and the automated assistant, prior to the user selecting the graphical control element. During the dialog session, the user would have provided a request to cause the connected device to perform the other function.

In other implementations, a method implemented by one or more processors is set forth as including operations such as determining that a user has provided a request for an automated assistant to perform a function. The request can be received at an automated assistant interface of a client device. The method can also include causing, in response to determining that the user has provided the request, the automated assistant to perform the function that corresponds to the request; and determining, in response to determining that the user has provided the request, a user preference that characterizes a historical inclination of the user to control another function of a connected device in a context associated with the function performed by the automated assistant. The connected device can be linked to the client device. In some implementations, the method can include identifying, based on determining the user preference, the connected device and a desired status for the connected device; and determining, based on identifying the connected device, a current status of the connected device. The current status can be affected by performance or nonperformance of the other function. The method can further include, when the desired status is different than the current status of the connected device: determining, based on identifying the other function and the current status of the connected device, a graphical control element for controlling the other function of the connected device. The graphical control element can indicate a capability of the graphical control element to cause the other function to be performed by the connected device resulting in the current status of the connected device changing to the desired status. Furthermore, the method can include causing, in response to determining the user has provided the request, a display panel associated with the client device to provide a composite graphical assistant interface that includes the graphical control element.

In some implementations, the method can include, when the desired status is equivalent to the current status of the connected device: causing, in response to determining the user has provided the request, a display panel associated with the client device to provide a particular composite graphical assistant interface that omits a particular graphical control element for controlling the other function of the connected device.

We claim:

1. A method implemented by one or more processors, the method comprising:
   determining, based at least in part on one or more current statuses corresponding to one or more third-party computing devices connected to a local network to which a computing device is also connected, a current context of a user, wherein the computing device provides access to an automated assistant and the automated assistant is controllable via a graphical user interface of the computing device, and wherein the one or more current statuses indicate one or more actions currently being performed by the corresponding one or more third-party computing devices;
   identifying, based on the current context of the user, one or more selection categories, wherein each selection category corresponds to a set of actions to recommend to the user via the graphical user interface of the computing device,
      wherein identifying a given selection category of the one or more selection categories is based on a degree of similarity between the current context of the user and a prior context in which the user previously commanded the automated assistant to initialize performance of the set of actions;
   assigning, based on the current context, one or more actions to the one or more selection categories according to a correlation between the one or more actions and the one or more selection categories;
   generating, based on identifying the one or more selection categories and based on assigning the one or more actions to the selection categories, an action suggestion element for each assigned action of the one or more actions; and
   causing each action suggestion element to be rendered at the graphical user interface of the computing device,
      wherein the automated assistant performs a corresponding action, of the one or more actions assigned to the one or more selection categories, in response to the user selecting a corresponding action suggestion element.

2. The method of claim 1, further comprising:
   generating, based on identifying the one or more selection categories and based on assigning the one or more actions to the selection categories, a categorical suggestion element for each identified selection category of the one or more selection categories, wherein the automated assistant performs a corresponding set of actions in response to the user selecting a corresponding categorical suggestion element at the graphical user interface.

3. The method of claim 1, further comprising:
   determining, based on identifying the one or more third-party computing devices, an operational status of at least one third-party computing device of the one or more third-party computing devices,
      wherein causing each action suggestion element to be rendered at the graphical user interface of the computing device includes causing each operational status to be rendered at the computing device with a corresponding action suggestion element that controls a corresponding third-party computing device.

4. The method of claim 1, further comprising:
   determining that the user selected an action rendered within a first selection category of the one or more selection categories and another action rendered within a second selection category of the one or more selection categories; and
   generating another categorical suggestion element that is assigned another set of actions that include the action and the other action.

5. The method of claim 1, wherein assigning the action to the given selection category comprises:
   assigning the action based on determining that the user interacted with the third-party computing device capable of performing the action concurrently with interacting with another third-party computing device that is capable of performing another action that is assigned to the given selection category.

6. The method of claim 1, wherein the degree of similarity between the current context of the user and the prior context is determined based on one or more of the third-party computing devices in the current context having similar statuses to the statuses of the one or more third-party computing devices in the prior context.

7. The method of claim 1, wherein determining the current context includes:
    determining that one or more of the plurality of current statuses has been updated from a corresponding previous status to the corresponding current status.

8. A method implemented by one or more processors, the method comprising:
    determining, based at least in part on one or more current statuses corresponding to one or more third-party computing devices connected to a local network to which a computing device is also connected, a current context of a user, wherein the computing device provides access to an automated assistant and the automated assistant is controllable via a graphical user interface of the computing device, and wherein the one or more current statuses indicate one or more actions currently being performed by the corresponding one or more third-party computing devices;
    identifying, based on the current context of the user, one or more selection categories, wherein a given selection category corresponds to a set of actions to recommend to the user via the graphical user interface of the computing device;
    assigning, based on the current context, one or more actions to the one or more selection categories according to a correlation between the one or more actions and the one or more selection categories,
        wherein assigning an action, capable of being performed by a third-party computing device of the one or more third-party computing devices, of the one or more actions to a given selection category of the one or more selection categories is based on (1) historical occurrences of the user causing performance of the action in the prior context that corresponds to the given selection category and is based on (2) a current status of the one or more current statuses corresponding to the third-party computing device;
    generating, based on identifying the one or more selection categories and based on assigning the one or more actions to the selection categories, an action suggestion element for each assigned action of the one or more actions, wherein generating at least one of the action suggestion elements includes:
        comparing the current status of the corresponding third-party computing device to a status of the corresponding third-party computing device while the user was in the prior context;
        identifying an indication from the user, while the user was in the prior context, to change the status of the device from a previous status to a desired status; and
        generating, based on the indication, the action suggestion element only when the current status differs from the desired status indicated by the user while the user was in the prior context; and
    causing each action suggestion element to be rendered at the graphical user interface of the computing device, wherein the automated assistant performs a corresponding action, of the one or more actions assigned to the one or more selection categories, in response to the user selecting a corresponding action suggestion element.

9. The method of claim 8, wherein assigning the action to the given selection category comprises:
    assigning the action based on determining that the user interacted with the third-party computing device capable of performing the action concurrently with interacting with another third-party computing device that is capable of performing another action that is assigned to the given selection category.

10. The method of claim 8, wherein the degree of similarity between the current context of the user and the prior context is determined based on one or more of the third-party computing devices in the current context having similar statuses to the statuses of the one or more third-party computing devices in the prior context.

11. The method of claim 8, wherein determining the current context includes:
    determining that one or more of the plurality of current statuses has been updated from a corresponding previous status to the corresponding current status.

12. The method of claim 8, further comprising:
    generating, based on identifying the one or more selection categories and based on assigning the one or more actions to the selection categories, a categorical suggestion element for each identified selection category of the one or more selection categories, wherein the automated assistant performs a corresponding set of actions in response to the user selecting a corresponding categorical suggestion element at the graphical user interface.

13. The method of claim 8, further comprising:
    determining, based on identifying the one or more third-party computing devices, an operational status of at least one third-party computing device of the one or more third-party computing devices,
        wherein causing each action suggestion element to be rendered at the graphical user interface of the computing device includes causing each operational status to be rendered at the computing device with a corresponding action suggestion element that controls a corresponding third-party computing device.

14. A system, comprising:
    one or more processors; and
    memory configured to store instructions that, when executed by the one or more processors, cause the one or more processors to perform operations that include:
        determining, based at least in part on one or more current statuses corresponding to one or more third-party computing devices connected to a local network to which a computing device is also connected, a current context of a user, wherein the computing device provides access to an automated assistant and the automated assistant is controllable via a graphical user interface of the computing device, and wherein the one or more current statuses indicate one or more actions currently being performed by the corresponding one or more third-party computing devices;
        identifying, based on the current context of the user, one or more selection categories, wherein each selection category corresponds to a set of actions to recommend to the user via the graphical user interface of the computing device,
            wherein identifying a given selection category of the one or more selection categories is based on a degree of similarity between the current context of the user and a prior context in which the user previously commanded the automated assistant to initialize performance of the set of actions;

assigning, based on the current context, one or more actions to the one or more selection categories according to a correlation between the one or more actions and the one or more selection categories;

generating, based on identifying the one or more selection categories and based on assigning the one or more actions to the selection categories, an action suggestion element for each assigned action of the one or more actions; and causing each action suggestion element to be rendered at the graphical user interface of the computing device, wherein the automated assistant performs a corresponding action, of the one or more actions assigned to the one or more selection categories, in response to the user selecting a corresponding action suggestion element.

15. The system of claim 14, further comprising:

generating, based on identifying the one or more selection categories and based on assigning the one or more actions to the selection categories, a categorical suggestion element for each identified selection category of the one or more selection categories, wherein the automated assistant performs a corresponding set of actions in response to the user selecting a corresponding categorical suggestion element at the graphical user interface.

16. The system of claim 14, wherein the operations further include:

determining, based on identifying the one or more third-party computing devices, an operational status of at least one third-party computing device of the one or more third-party computing devices, wherein causing each action suggestion element to be rendered at the graphical user interface of the computing device includes causing each operational status to be rendered at the computing device with a corresponding action suggestion element that controls a corresponding third-party computing device.

17. The system of claim 14, wherein the operations further include:

determining that the user selected an action rendered within a first selection category of the one or more selection categories and another action rendered within a second selection category of the one or more selection categories; and generating another categorical suggestion element that is assigned another set of actions that include the action and the other action.

18. The system of claim 14, wherein assigning the action to the given selection category comprises:

assigning the action based on determining that the user interacted with the third-party computing device capable of performing the action concurrently with interacting with another third-party computing device that is capable of performing another action that is assigned to the given selection category.

19. The system of claim 14, wherein the degree of similarity between the current context of the user and the prior context is determined based on one or more of the third-party computing devices in the current context having similar statuses to the statuses of the one or more third-party computing devices in the prior context.

20. The system of claim 14, wherein determining the current context includes:

determining that one or more of the plurality of current statuses has been updated from a corresponding previous status to the corresponding current status.

* * * * *